(12) United States Patent
Fall et al.

(10) Patent No.: US 10,015,437 B2
(45) Date of Patent: Jul. 3, 2018

(54) SUPPORTING TRANSPORT DIVERSITY AND TIME-SHIFTED BUFFERS FOR MEDIA STREAMING OVER A NETWORK

(71) Applicant: QUALCOMM Incorporated, San Diego, CA (US)

(72) Inventors: Kevin Roland Fall, Bethel Park, PA (US); Nagaraju Naik, San Diego, CA (US); Thomas Stockhammer, Bergen (DE); Fatih Ulupinar, San Diego, CA (US); Carlos Marcelo Dias Pazos, Carlsbad, CA (US); Charles N. Lo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

(21) Appl. No.: 14/153,888

(22) Filed: Jan. 13, 2014

(65) Prior Publication Data

US 2014/0201323 A1 Jul. 17, 2014

Related U.S. Application Data

(60) Provisional application No. 61/752,456, filed on Jan. 15, 2013, provisional application No. 61/809,871, filed on Apr. 8, 2013.

(51) Int. Cl.
*G06F 15/16* (2006.01)
*H04N 5/91* (2006.01)
(Continued)

(52) U.S. Cl.
CPC ........... *H04N 5/91* (2013.01); *H04L 65/4076* (2013.01); *H04L 65/4084* (2013.01);
(Continued)

(58) Field of Classification Search
None
See application file for complete search history.

(56) References Cited

U.S. PATENT DOCUMENTS

| 6,052,718 A | 4/2000 | Gifford |
| 6,990,512 B1 | 1/2006 | Major et al. |

(Continued)

FOREIGN PATENT DOCUMENTS

| CN | 1902865 A | 1/2007 | |
| EP | 1322094 A1 * | 6/2003 | ............. H04L 29/06 |

(Continued)

OTHER PUBLICATIONS

3GPP TS 26.346 V11.1.0 (Jun. 2012), 3rd Generation Partnership Project; Technical Specification Group Services and System Aspects; Multimedia Broadcast/Multicast Service (MBMS); Protocols and codecs (Release 11), 2012, 168 pp. [uploaded in parts].

(Continued)

*Primary Examiner* — Phyllis A Book
(74) *Attorney, Agent, or Firm* — Shumaker & Sieffert, P.A.

(57) ABSTRACT

A proxy unit is configured to obtain mapping information that maps an identifier for media data to a resource location based on a service for retrieving the media data, wherein the service defines at least one of a plurality of types of transports for transporting the media data, receive a request for the media data from an application service client, determine whether the service is available, and, when the service is available, cause the application service client to receive the media data from a unit that receives the media data using the service from the resource location, based on the mapping information. In this manner, the application service client may receive media data from the unit (e.g., a middleware unit), which then receives the media data using a service that defines transport according to, e.g., broadcast or multicast (Continued)

transport, or another fashion (e.g., unicast) if the defined transport is unavailable.

22 Claims, 25 Drawing Sheets

(51) Int. Cl.
    *H04L 29/06*     (2006.01)
    *H04L 29/08*     (2006.01)
    *H04W 4/18*     (2009.01)

(52) U.S. Cl.
    CPC ............ *H04L 65/608* (2013.01); *H04L 67/10* (2013.01); *H04L 67/1097* (2013.01); *H04L 67/2814* (2013.01); *H04L 67/2842* (2013.01); *H04W 4/18* (2013.01)

(56) References Cited

U.S. PATENT DOCUMENTS

| | | | |
|---|---|---|---|
| 7,454,510 B2 | 11/2008 | Kleyman et al. | |
| 8,451,762 B2 | 5/2013 | Liu et al. | |
| 8,458,290 B2 | 6/2013 | Black et al. | |
| 2003/0229900 A1* | 12/2003 | Reisman | G06F 17/30873 725/87 |
| 2004/0249951 A1* | 12/2004 | Grabelsky | H04L 29/06 709/227 |
| 2005/0165828 A1* | 7/2005 | Lango | G06F 12/0866 |
| 2006/0031559 A1 | 2/2006 | Sorokopud et al. | |
| 2006/0179145 A1* | 8/2006 | Khawand | H04L 67/14 709/227 |
| 2007/0011345 A1 | 1/2007 | Klemets | |
| 2007/0130597 A1 | 6/2007 | Parker et al. | |
| 2008/0022340 A1 | 1/2008 | Hannuksela et al. | |
| 2008/0069126 A1 | 3/2008 | Howcroft et al. | |
| 2009/0068996 A1* | 3/2009 | Bakker | H04L 65/1016 455/414.1 |
| 2010/0169504 A1* | 7/2010 | Gabin | H04L 65/4076 709/231 |
| 2010/0179986 A1 | 7/2010 | Sebastian et al. | |
| 2010/0180011 A1* | 7/2010 | Sood | G06F 15/16 709/219 |
| 2011/0029688 A1* | 2/2011 | Jung | H04L 29/12066 709/238 |
| 2011/0066703 A1 | 3/2011 | Kaplan et al. | |
| 2011/0219416 A1 | 9/2011 | Lindquist et al. | |
| 2011/0239078 A1 | 9/2011 | Luby et al. | |
| 2012/0042050 A1 | 2/2012 | Chen et al. | |
| 2012/0089740 A1 | 4/2012 | Yin et al. | |
| 2012/0110120 A1 | 5/2012 | Willig et al. | |
| 2012/0124179 A1* | 5/2012 | Cappio | H04L 65/104 709/219 |
| 2012/0209952 A1* | 8/2012 | Lotfallah | H04L 65/4084 709/217 |
| 2012/0210041 A1* | 8/2012 | Flynn | G06F 1/183 711/3 |
| 2012/0259994 A1 | 10/2012 | Gillies et al. | |
| 2012/0263089 A1 | 10/2012 | Gupta et al. | |
| 2013/0007223 A1* | 1/2013 | Luby | H04N 21/23106 709/219 |
| 2013/0007814 A1 | 1/2013 | Cherian et al. | |
| 2013/0110968 A1 | 5/2013 | Horman et al. | |
| 2013/0159455 A1* | 6/2013 | Braskich | H04L 67/303 709/217 |
| 2013/0182643 A1 | 7/2013 | Pazos et al. | |
| 2013/0191509 A1* | 7/2013 | Loughry | G06F 9/541 709/219 |
| 2013/0247118 A1* | 9/2013 | Oyman | H04W 72/0413 725/109 |
| 2013/0294321 A1 | 11/2013 | Wang et al. | |
| 2014/0199044 A1 | 7/2014 | Gupta et al. | |
| 2014/0372624 A1 | 12/2014 | Wang et al. | |
| 2015/0012584 A1 | 1/2015 | Lo et al. | |

FOREIGN PATENT DOCUMENTS

| | | |
|---|---|---|
| WO | 2012138909 A1 | 10/2012 |
| WO | 2012167106 A1 | 12/2012 |
| WO | 2013003793 A1 | 1/2013 |

OTHER PUBLICATIONS

Berners-Lee, Network Working Group; Request for Comments: 3986 STD: 66 Updates 1738 Obsoletes: 2732, 2396, 1808 Category: Standards Track; W3C/MIT R Fielding Day Sotware L Masinter Adobe Systems, Jan. 2005, Uniform Resource Identifier (URI): Generic Syntax, 61 pp.
ETSI TS 102 471, V1 4.1, "Digital Video Broadcasting (DVB), IP Datacast over DVG-H: Electronic Service Guide (ESG)," Mar. 2010, 139 pp. [uploaded in parts].
Handley, et al., "SDP: Session Description Protocol," Network Working Group, RFC 4566, Jul. 2006, 50 pp.
International Preliminary Report on Patentability from International Application No. PCT/US2014/011475, dated Dec. 23, 2014, 13 pp.
International Search Report and Written Opinion from International Application No. PCT/US2014/011475, dated Apr. 9, 2014, 10 pp.
ISO/IEC 23009-1: "Information technology—Dynamic adaptive streaming over HTTP (DASH)—Part 1: Media presentation description and segment formats," Technologies de l' information—Diffusion en flux adaptatif dynamique sur HTTP (DASH)—Part 1: Description of the presentation and delivery of media formats, ISO/IEC 23009-1 International Standard, First Edition, Apr. 2012, XP002712145, 132 pp.
Paila, et al., "FLUTE—File Delivery over Unidirectional Transport; rfc6726.txt", Internet Engineering Task Force, IETF; Standard, Internet Society (ISOC) 4, Rue Des Falaises CH—1205 Geneva, Switzerland, Nov. 6, 2012, XP015086468, 46 pp.
Tech, et al., "3D-HEVC Test Model 3", JCT-3V Meeting; MPEG Meeting; Jan. 17-20, 2013; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-C1005, XP030130664, 52 pp.
Qualcomm Incorporated: "Combination of MBMS and DASH," 3GPP TSG-SA WG4#70, S4-121046, Aug. 13-17, 2012, URL:http://www.3gpp.org/ftp/tsg_sa/WG4_CODEC/TSGS4_70/Docs/S4-121046.zip, 4 pages.
Qualcomm Incorporated: "USD Indication of DASH Representation Transport Mode," 3GPP TSG-SA WG4#71, S4-121315, Bratislava, Slovakia Nov. 5-9, 2012, URL:http://www.3gpp.org/ftp/tsg_sa/WG4_CODEC/TSGS4_71/Docs/S4-121315.zip, 9 pages.
Tokumo, et al., "Response to CfPs on MPEG Media Transport (MMT)," ISO/SEC JTC1/SC291WG11 MPEG2011/M19194, Jan. 2011, 8 pp.

* cited by examiner

SUPPORTING TRANSPORT DIVERSITY AND TIME-SHIFTED BUFFERS FOR MEDIA STREAMING OVER A NETWORK

This application claims the benefit of U.S. Provisional Application Ser. No. 61/752,456, filed Jan. 15, 2013, and U.S. Provisional Application Ser. No. 61/809,871 filed Apr. 8, 2013, the entire contents of each of which are hereby incorporated by reference.

TECHNICAL FIELD

This disclosure relate to communication systems, and more particularly, to delivery of content via a network.

BACKGROUND

Digital multimedia (including audio and video and other media) capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital multimedia devices implement video, audio, and/or other media compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital multimedia information more efficiently.

Multimedia compression techniques perform spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to neighboring blocks. Blocks in an inter-coded (P or B) frame or slice may use spatial prediction with respect to neighboring blocks in the same frame or slice or temporal prediction with respect to other reference frames.

After multimedia data has been encoded (e.g., compressed), the data may be packetized for transmission or storage. The data may be assembled into a file conforming to any of a variety of standards, such as the International Organization for Standardization (ISO) base media file format and extensions thereof, such as AVC.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile devices, such as UEs. In prior applications, a method for facilitating high bandwidth communication for multimedia has been single frequency network (SFN) operation. SFNs utilize radio transmitters, such as, for example, eNBs, to communicate with subscriber UEs. In unicast operation, each eNB is controlled so as to transmit signals carrying information directed to one or more particular subscriber UEs. The specificity of unicast signaling enables person-to-person services such as, for example, voice calling, text messaging, or video calling.

SUMMARY

In general, this disclosure describes techniques for streaming media data over a network. For example, this disclosure describes techniques for receiving media data via various types of transports, e.g., any of unicast, broadcast, and/or multicast. For instance, a redirector/proxy unit may cause an application service client to retrieve media data from the Internet directly via unicast, or when a broadcast or multicast service is available, from a broadcast or multicast middleware unit. Alternatively, the redirector/proxy unit may retrieve the media data on behalf of the application service client when the broadcast or multicast service is not available. When multiple types of transports are available and/or used to convey media data, the term "transport diversity" may be used below. When the provider (media origin) and/or transport(s) used to convey media are changed (e.g., by a redirector/proxy unit), the term "redirection" or "redirected" may be used below.

This disclosure also describes techniques related to buffering retrieved media data. For instance, retrieved media data may be stored in a time-shifted buffer (TSB). This disclosure describes techniques for signaling a size of the TSB, e.g., in terms of playback time for the media content, such that an appropriate amount of memory can be allocated for the TSB. In this manner, the media data can be played back at a later time and/or played back using a trick mode, e.g., fast forward or rewind.

In one example, a method of retrieving media data includes, by using a proxy unit: obtaining mapping information that maps an identifier for media data to a resource location based on a service for retrieving the media data, wherein the service defines at least one of a plurality of types of transports for transporting the media data, receiving a request for the media data from an application service client, determining whether the service is available, and, when the service is available, causing the application service client to receive the media data from a unit that receives the media data using the service from the resource location, based on the mapping information.

In another example, a device for retrieving media data includes a proxy unit configured to obtain mapping information that maps an identifier for media data to a resource location based on a service for retrieving the media data, wherein the service defines at least one of a plurality of types of transports for transporting the media data, receive a request for the media data from an application service client, determine whether the service is available, and, when the service is available, cause the application service client to receive the media data from a unit that receives the media data using the service from the resource location, based on the mapping information.

In another example, a device for retrieving media data includes means for obtaining mapping information that maps an identifier for media data to a resource location based on a service for retrieving the media data, wherein the service defines at least one of a plurality of types of transports for transporting the media data, means for receiving a request for the media data from an application service client, means for determining whether the service is available, and means for causing, when the service is available, the application service client to receive the media data from a unit that receives the media data using the service from the resource location, based on the mapping information.

In another example, a computer-readable storage medium has stored thereon instructions that, when executed, cause a processor to obtain mapping information that maps an identifier for media data to a resource location based on a service for retrieving the media data, wherein the service defines at least one of a plurality of types of transports for transporting the media data, receive a request for the media data from an application service client, determine whether the service is available, and cause, when the service is available, the application service client to receive the media data from a unit that receives the media data using the service from the resource location, based on the mapping information.

In another example, a method of processing media data includes receiving a session description protocol (SDP) message including an attribute that defines a time-shifted buffer (TSB) depth, determining an amount of memory for the TSB based on a value of the attribute, allocating the determined amount of memory to form the TSB, and storing at least a portion of media data associated with the SDP message in the TSB.

In another example, a device for processing media data includes one or more processors configured to receive a session description protocol (SDP) message including an attribute that defines a time-shifted buffer (TSB) depth, determine an amount of memory for the TSB based on a value of the attribute, allocate the determined amount of memory to form the TSB, and store at least a portion of media data associated with the SDP message in the TSB.

In another example, a device for processing media data includes means for receiving a session description protocol (SDP) message including an attribute that defines a time-shifted buffer (TSB) depth, means for determining an amount of memory for the TSB based on a value of the attribute, means for allocating the determined amount of memory to form the TSB, and means for storing at least a portion of media data associated with the SDP message in the TSB.

In another example, a computer-readable storage medium having stored thereon instructions that, when executed, cause a processor to receive a session description protocol (SDP) message including an attribute that defines a time-shifted buffer (TSB) depth, determine an amount of memory for the TSB based on a value of the attribute, allocate the determined amount of memory to form the TSB, and store at least a portion of media data associated with the SDP message in the TSB.

DETAILED DESCRIPTION

Figure 1:
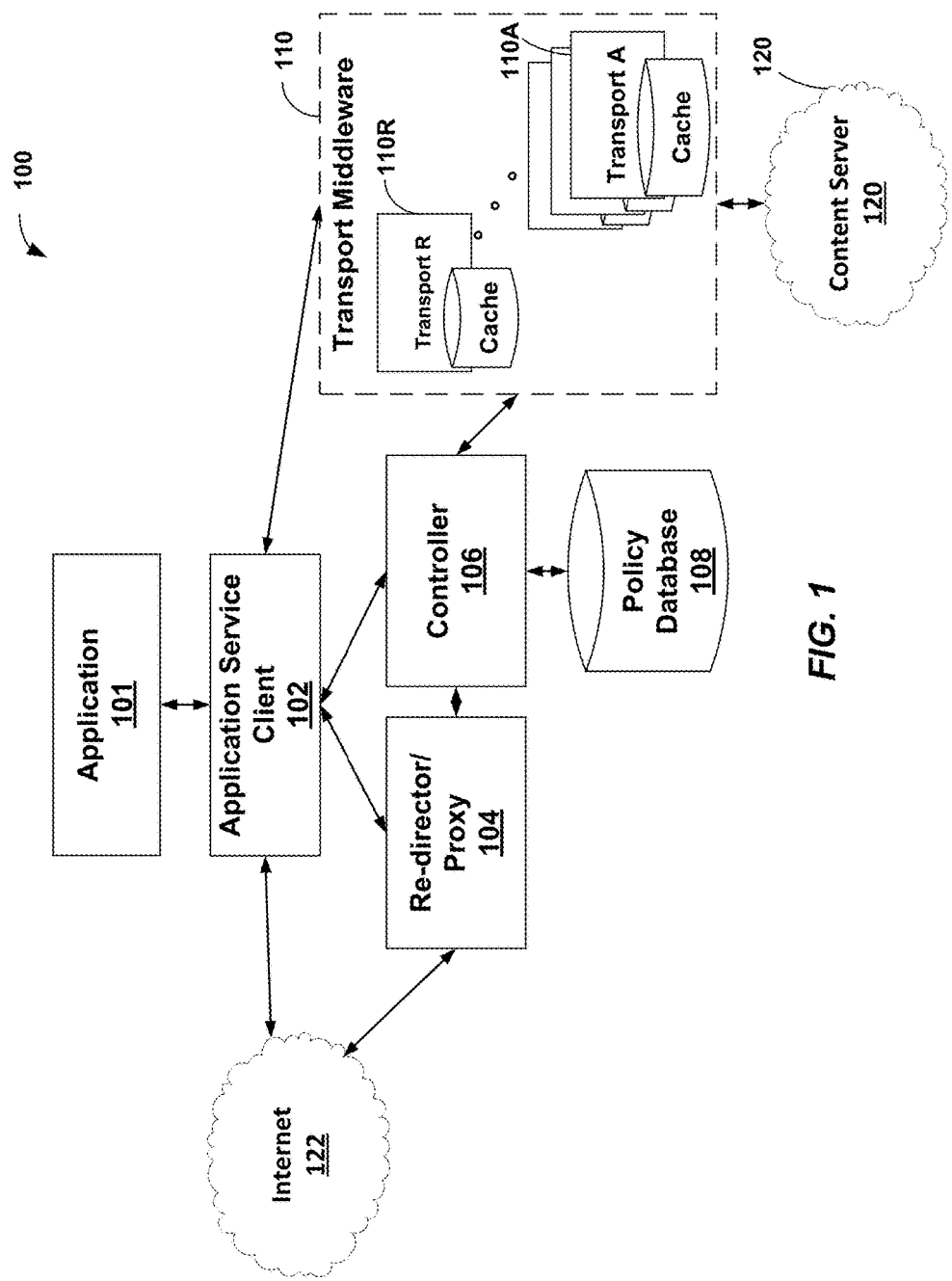
FIG. 1 illustrates an example system for supporting transport diversity.

In general, this disclosure describes techniques for supporting various types of transport mechanisms for streaming media data, such as audio and/or video data, through a network. For example, an application service client (which may also be referred to as a streaming client) may be configured to interact with a proxy unit to retrieve media data either according to a unicast protocol or a broadcast (or multicast) protocol. In some examples, the proxy unit may determine whether the media data can be retrieved using the broadcast protocol, e.g., based on whether a client device is within an area of coverage of a service provider for delivering media data using the broadcast protocol, and select either the unicast protocol or the broadcast protocol based on whether the client device is within the area of coverage. The client device may execute the application service client and/or include the proxy unit. In some examples, the client device may execute the application service client, and the proxy unit may be included in a device separate from the client device.

The techniques of this disclosure may be used in conjunction with various application-layer protocols for streaming media data. For example, the techniques of this disclosure may be used in conjunction with Dynamic Adaptive Streaming over HTTP (DASH), which utilizes HTTP to stream media data. As another example, the techniques of this disclosure may be used in conjunction with Real-time Transport Protocol (RTP) or Real-Time Streaming Protocol (RTSP). In these and other instances, an application service client (e.g., an RTP client, an RTSP client, or a DASH client) may be transport-agnostic, in the sense that the application service client need not be aware of a transport mechanism used to retrieve media data. For instance, the application service client need not be aware of whether an underlying transport mechanism corresponds to a unicast protocol or a broadcast or multicast protocol.

As discussed in greater detail below, the proxy unit (which may also be referred to as a redirector/proxy unit) may be configured to receive a request from an application service client, where the request specifies certain media data. The proxy unit may determine whether the media data can be retrieved using a particular transport mechanism, e.g., a broadcast protocol or a unicast protocol. The proxy unit may then cause the application service client to receive the media data using one of the transport mechanisms (based on availability, preference, reliability, and/or other factors). For example, if the broadcast protocol is more preferable than the unicast protocol, and the broadcast protocol is available, the proxy unit may cause the application service client to receive the media data via the broadcast protocol, whereas if the broadcast protocol is not available, the proxy unit may cause the application service client to receive the media data via the unicast protocol.

As one example, with respect to DASH, media data may be available from one or more servers, e.g., a broadcast server and a unicast server, as a broadcast and/or a unicast service. A DASH client may receive a modified media presentation description (MPD) for the media data that indicates that the media data is available from a proxy unit (rather than the server(s)). When the DASH client sends a request for media data to the proxy unit, the proxy unit may determine whether a unicast protocol or a broadcast protocol is available for retrieving the requested media data. If the broadcast protocol is available, a broadcast receiving unit (e.g., a multimedia broadcast multicast services (MBMS) or evolved MBMS (eMBMS) middleware unit) may receive the media data, and the proxy unit may cause the DASH client to send a request for the media data to the broadcast receiving unit. On the other hand, if the broadcast protocol is not available, the proxy unit may cause the DASH client to send a request for the media data to a unicast server, to retrieve the media data using unicast. Alternatively, the proxy unit may retrieve the media data from the unicast server, and then provide the retrieved media data to the DASH client. In some examples, the unicast server and the broadcast server may correspond to the same server.

As another example, with respect to RTP or RTSP, an RTP client (which, alternatively, may correspond to an RTSP client) may submit DESCRIBE, SETUP, and PLAY commands to a proxy unit. In response to the DESCRIBE command, the proxy unit may provide a modified session description protocol (SDP) message to the RTP client. The modified SDP message may specify an address of the proxy unit as the address from which the media data is available. This modified SDP message may cause the RTP client to send the SETUP and PLAY commands to the proxy unit. When the proxy unit determines that the broadcast protocol is available, the proxy unit may send SETUP and PLAY commands to a broadcast receiving unit (e.g., an MBMS or eMBMS middleware unit), which may receive the media data and forward the media data to the RTP client. On the other hand, when the proxy unit determines that the broadcast protocol is not available, the proxy unit may retrieve the media data from a unicast server, and then provide the retrieved media data to the RTP client.

In some examples, components for performing the techniques of this disclosure may include an application service client, a proxy unit, and a broadcast receiving unit. In various examples, a client device may include any or all of these components, alone or in any combination. Alternatively, the client device may include the application service client, and the proxy unit and/or the broadcast receiving unit may be included in one or more devices that are separate from the client device.

Moreover, this disclosure also describes techniques related to signaling data for a time-shifted buffer (TSB). A client device (also referred to herein as "user equipment") may allocate memory to form a TSB to be used for holding media data in support of various trick modes, such as fast forward, rewind, replay, or the like. In general, a trick mode may refer to a playback mode in which media data is played back in an order or rate other than a defined output order. For instance, in fast forward, certain media data may be skipped. As another example, in rewind, an output order for media data may be inverted, and certain media data may also be skipped. To skip media data, e.g., with respect to video data, only pictures coded using an intra-coding mode could be displayed, skipping inter-coded pictures.

In accordance with the techniques of this disclosure, data may be signaled in, e.g., an SDP message, for instantiating a TSB. For example, a TSB attribute may be signaled, with a value defining, in seconds, an amount of media data that can be stored in the TSB. A client device may calculate an amount of memory needed for the TSB based on the value of the TSB attribute. This calculation may involve, for video data as an example, a frame rate of video data in the media data. The client device may calculate a memory size for the TSB based on an average amount of data per picture, a number of pictures in a period of time (based on frame rate), and a length of time as defined by the TSB attribute. Likewise, the client device may further determine an amount of memory needed for audio data, text data, or other data or media for the period of time. Thus, the client device may allocate this data to the TSB for storing media data to perform trick modes. Furthermore, the client device may perform trick modes for data received via a broadcast protocol, such as MBMS or eMBMS.

In other words, in some examples, the techniques of this disclosure include a middleware architecture for supporting features of Real-time Protocol/Real-time Streaming Protocol (RTP/RTSP) streaming over evolved Multimedia Broadcast Multicast Service (eMBMS) network. These features include time-shifted buffer and transport diversity (e.g., unicast to broadcast switching or vice-versa for content delivery). For the time-shifted buffer (TSB) feature, the architecture may support extensions of the session description protocol (SDP) to include data signaling a buffer depth. As one example of the transport diversity feature, this disclosure describes proposes an architecture where applications consuming the content need not be aware of the details of transport switching from unicast to broadcast or vice-versa, as this switching may be managed in the middleware level.

In HTTP streaming, frequently used operations include GET and partial GET. The GET operation requests the retrieval of a whole file associated with a given uniform resource identifier (URI) (e.g., URL or URN). The partial GET operation requests the retrieval of a byte range (subset) of a resource. Thus, movie fragments may be provided for HTTP streaming, because a GET or partial GET operation can retrieve one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming DASH data using HTTP, there may be multiple representations for video and/or audio data of multimedia content. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include dynamic updates of the MPD.

A media representation may contain a sequence of one or more periods. Periods may be defined by a Period element in the MPD. Each period may have an attribute start in the MPD. The MPD may include a start attribute and an availablityStartTime attribute for each period. For live services, the sum of the start attribute of the period and the MPD attribute availableStartTime may specify the availability time of the period in UTC format, in particular the first Media Segment of each representation in the corresponding period. For on-demand services, the start attribute of the first period may be 0. For any other period, the start attribute may specify a time offset between the start time of the corresponding Period relative to the start time of the first Period. Each period may extend until the start of the next Period, or until the end of the media presentation in the case of the last period. Period start times may be precise. They may reflect the actual timing resulting from playing the media of all prior periods.

Each period may contain one or more representations for the same media content. A representation may be one of a number of alternative encoded versions of audio, video or other data. The representations may differ by encoding types, e.g., by bitrate, resolution, and/or codec for video data and bitrate, language, and/or codec for audio data. The term representation may be used to refer to a section of encoded audio or video data or other media or data corresponding to a particular period of the multimedia content and encoded in a particular way.

Representations of a particular period may be assigned to a group indicated by a group attribute in the MPD. Representations in the same group are generally considered alternatives to each other. For example, each representation of video data for a particular period may be assigned to the same group, such that any of the representations may be selected for decoding to display video data of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced using an identifier, such as a uniform resource identifier (URI) (e.g., uniform resource locator (URL) or uniform resource name (URN)). The MPD may provide the identifiers for each segment. In some examples, the MPD may also provide byte ranges in the form of a range attribute, which may correspond to the data for a continuous byte range of segment within a resource (e.g., file) accessible by referencing the corresponding URI.

Each representation may also include one or more media components, where each media component may correspond to an encoded version of one individual media type, such as audio, video, or timed text (e.g., for closed captioning). Media components may be time-continuous across boundaries of consecutive media segments within one representation.

The techniques described herein may be used for the wireless networks and radio technologies mentioned above as well as other wireless networks and radio technologies. For clarity, certain aspects of the techniques are described below for LTE, and LTE terminology is used in much of the description below.

RTP/RTSP streaming is a common protocol for supporting real-time streaming services. The 3GPP specification for eMBMS services describes the architecture for RTP streaming over Long Term Evolution (LTE) networks. However, this disclosure, recognizes two problems with RTP/RTSP, and discusses techniques that may be used to overcome these problems.

The Time-shifted buffer (TSB) is a feature that may be used to store a portion of media content in User Equipment (UE). The buffer allows users to move the playback point of media content forward or backward. In this process, the UE needs to have been informed of the buffer depth, which provides an indication of how much time worth of content the UE needs to accumulate at the device to allow for trick mode playback, e.g., fast-forward and rewind of playback. In one implementation of a VLC media player, the TSB feature is enabled by providing the buffer depth as an argument to the VLC player at startup. The process is not automatic, and instead requires intervention of a user to provide the buffer depth argument and consequently enable the TSB. This disclosure describes techniques for supporting a TSB in an eMBMS-enabled middleware layer, such as a multicast services device client (MSDC).

The session description protocol (SDP) describes endpoint information of a streaming service and its media stream (session) related parameters, collectively known as a "session profile." Therefore, if a streaming service is available in different transport methods, multiple profiles that describe different transport/endpoint parameters for the service are needed. For example, a broadcast real-time RTP-based service can refer to a multicast IP address and port for its media streams, whereas the unicast version of the service may refer to a unicast IP address and port. There may be different representations of the media streams for broadcast and unicast delivery methods. In LTE networks, the MSDC provides delivery of streaming services to eMBMS-enabled applications. To support switching between unicast and other (e.g., broadcast or multicast) transport methods, it needs to utilize multiple session profiles, the choice of which will be based mainly on whether a UE is out of coverage or in coverage of broadcast. Whenever a UE moves to broadcast coverage area, the MSDC may use the broadcast-enabled version of the SDP profile to set up a connection and consume content. However, in the reverse scenario, when a UE moves out of broadcast coverage, MSDC may need to use the unicast SDP and set up a unicast connection with the remote RTSP server to consume unicast content. To keep the transitions between unicast and broadcast hidden from users or applications, this disclosure describes a mechanism for seamless transition.

This disclosure describes, among other techniques, techniques related to supporting the TSB and techniques for supporting transport switching, which may be used alone, together, and/or in any combination with other techniques described in this disclosure. For enabling the TSB feature in RTP-based streaming over eMBMS, this disclosure describes techniques for using the extension of the SDP mechanism to signal the time-shifted buffer depth value. For the transport switching problem, this disclosure describes a unified approach for an SDP description that includes both unicast and broadcast descriptions. Also, in order to make the transitions between broadcast and unicast seamless to the applications/users, this disclosure describes a middleware-based solution where the middleware handles the redirection of content using unified SDP, hiding the process from the users.

In accordance with aspects of the subject matter of this disclosure, there are provided methods, apparatus, and an architecture for deployment within a client device or collection of devices, to provide a layer of abstraction wherein multiple different types of transport mechanisms/protocols (e.g., eMBMS, digital video broadcast (DVB), etc.) may be employed to, e.g., deliver meta-data and digital content to applications of a client. Applications need not be cognizant of the details of each individual transport. The disclosure may include the option of a configurable set of policies which may be used to determine the choice, location, or timing of availability of data and meta-data that are delivered to the applications.

Applications that access web content on the Internet may identify the content (or its constituent parts) using a universal resource identifier (URI), which may be a universal resource locator (URL) that utilizes the HTTP or HTTP secure (HTTPS) schemes. For example, in the context of MPEG-DASH, URL references containing the HTTP or HTTPS schemes may be resolved using the HTTP or HTTPS protocols. In addition, HTTP may be used to fetch data referenced by the URLs. The DASH standard may utilize non-HTTP URLs, and the disclosure may relate to cases where arbitrary requests (including HTTP-based requests) from clients are handled in a flexible manner that provides an option to cause requests to be directed to a different location, at a different time, and/or instruct the requesting client to access alternative content.

Techniques of this disclosure may involve the instantiation of a re-director function that handles client requests for content. The re-director (also referred to herein as a redirector/proxy) may be able to apply processing to the material identified in a client request, invoke a method or algorithm to compare the result of this processing against a table of matching criteria, and indicate to the client an alternative location, access method, timing information, or content (e.g., in a file) so that the client may know where to perform a subsequent request. In another aspect, the re-director may perform the request for the content on the client's behalf and fetch the requested content. In this case, the re-director may act in a proxy or recursive function.

FIG. 1 is a block diagram illustrating an example system 100 for supporting transport diversity. The example system 100 may include an application 101, e.g., of a mobile device. The application 101 may perform a request for content. For example, a DASH multimedia playback application processes a manifest or MPD, and determines URLs containing meta-data and data, and sends HTTP requests. The request for content may use a pre-determined, pre-configured, or dynamically determined protocol port (e.g., with TCP or UDP) such as a protocol that would typically be used in configuring a web browser's "proxy" function. The determination of the protocol port may include using a configuration file, e.g., established by a user or network/system administrator such as in a proxy auto-config (PAC) file, or via protocol such as by web proxy auto-discovery protocol (WPAD).

A re-director/proxy 104 may receive the application's 101 request via an application service client 102 and process or parse the request to determine the requested content. The re-director/proxy 104 may compare the result against a table (or other suitable type of data structure) containing matching criteria to determine if a match has occurred. If a match occurs, the re-director/proxy 104 may determine a redirection target. The target may be delivered to the application 101. In another aspect, the re-director/proxy 104 may act in a recursive fashion and the application 101 may not need to process the redirection target. For example, the re-director/proxy 104 may fetch the content based on the redirection target on behalf of the application 101.

The re-director/proxy 104 may be co-located with the application 101 on the same device, or the re-director/proxy 104 may be located on a separate device. In the case of a co-located re-director/proxy 104, the application 101 may communicate with the re-director/proxy 104 through HTTP, application programming interface (API), inter-process communication (IPC), etc. In the case of the re-director/proxy 104 located on a separate device, the application 101 may communicate with the re-director (via the application service client 102) through HTTP, etc.

Subsequent to the determination of a "match" (or non-match), a re-direction target may be provided to the application 101. The target may indicate alternative content object(s) to access in lieu of content object(s) requested by the application 101. There may be various methods by which the re-direction target may be indicated to the application 101.

Signaling between components of the system 100 may be performed using an API or IPC. This aspect, the API or IPC mechanism may be utilized to provide communication between the re-director/proxy 104 and the application 101. In the case of using the API, the re-director/proxy 104 may invoke methods or procedures implemented within the application 101 or application library to indicate the redirect target.

Signaling between components of the system 100 may be performed through meta-data re-writing. In this aspect, the meta-data (e.g., a DASH MPD) may be re-written so as to indicate alternative references for objects. For example, a URI present in the original meta-data may be re-written to form an alternative URI for accessing equivalent or replacement content.

Signaling between components of the system 100 may be performed using indications in a communication protocol. In this aspect, an application layer communications protocol (e.g., HTTP) may be utilized in such a way as to communicate signaling information to the application 101. In one variant, the HTTP response code category of "re-direct" may be used (e.g., this may correspond to codes of the form 3xx, where x may be a number from zero through nine). In one subcase of this variant, e.g., the code 300 (indicating multiple choices available) may be used, in which the re-director/proxy 104 provides a vector of references (e.g., URIs) from which an application 101 may select one or more for use.

The matching function may give the result of comparing object references originated from the application 101 (e.g., a request URI) with object references present in a data structure (e.g., a file, database, matching table, etc.).

By way of non-limiting examples, in one aspect, matching criteria may be expressed as URI prefixes and a single preferred match occurs is indicated by the match with the longest prefix (e.g., as determined by the number of bits or bytes in common). In another aspect, each potential match may be assigned a corresponding priority number, and the entry with the largest (or smallest) priority number may be selected.

In another aspect, matching criteria may be expressed as regular expressions, and the preferred match may be determined using the largest number of matching characters. In another variation, regular expressions may be used to express the matching criteria and the potential match with the largest (or smallest) priority number may be selected.

The matching algorithm or contents of the data structure discussed above may be based on policies that may be pre-determined or pre-configured. In another aspect, the policies may be dynamically added or deleted from a logical policy database. The policy database may be implemented using various data structures and is not limited to any particular type of data structure or database implementation.

Policies may be used to determine the operation of the matching algorithm in a number of ways including, for example, prioritizing or de-prioritizing matching criteria from one source over other(s) (e.g., one transport type may be favor/disfavored over (s)); removing matching criteria as a function of source, time, redirection target, and/or matching criteria value; adding matching criteria as a function of source or time or redirection target or matching criteria value; and/or modifying matching criteria as a function of source or time or redirection target or matching criteria value.

The example system 100 may include a transport middleware 110 for requesting content based on the redirected location. The transport middleware 110 may include a number of transport mechanisms/protocol such as Transport A 110A through Transport R 110R. Each transport mechanism (Transport A 110A through Transport R 110R) may have a corresponding module capable of acquiring a list and details of file information and producing, e.g., a summarizing URI or common URI prefix. These modules may convey this information via a communication mechanism (e.g., IPC, API, or protocol) to the Controller 106 which may apply policy and resolution, and which may in turn program the re-director/proxy 104 subject to the policy. The transport mechanisms (Transport A 110A through Transport R 110R) may include, e.g., eMBMS, DVB-T2, DVB-S, other DVB-family broadcast technologies, or the like. Each transport middleware may include a cache for storing content or other data. For example, the transport middleware may cache a starting segment of content so that content delivery to the application 101 may appear instantaneous to the user. The transport middleware 110 may request the content from a source such as a content server 120. Additionally or alternatively, the client may request the content over a network, including the Internet 122. For the re-director/proxy 104 configured for proxy or "recursive" operation, the re-director/proxy 104 may request content via the transport middleware 110 or via a network or the Internet 122. The re-director/proxy 104 may be pre-configured to operate in one of the re-direction or proxy roles. The role of the re-director/proxy 104 may be determined at run-time, e.g., based on a set of rules.

Figure 2A:
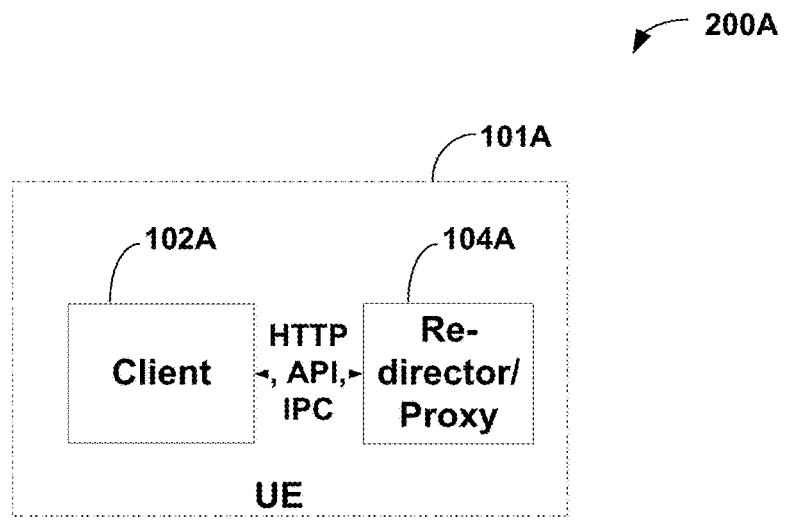
FIGS. 2A-2B illustrate alternative examples of apparatus including a re-director/proxy for supporting transport diversity.
Figure 2B:
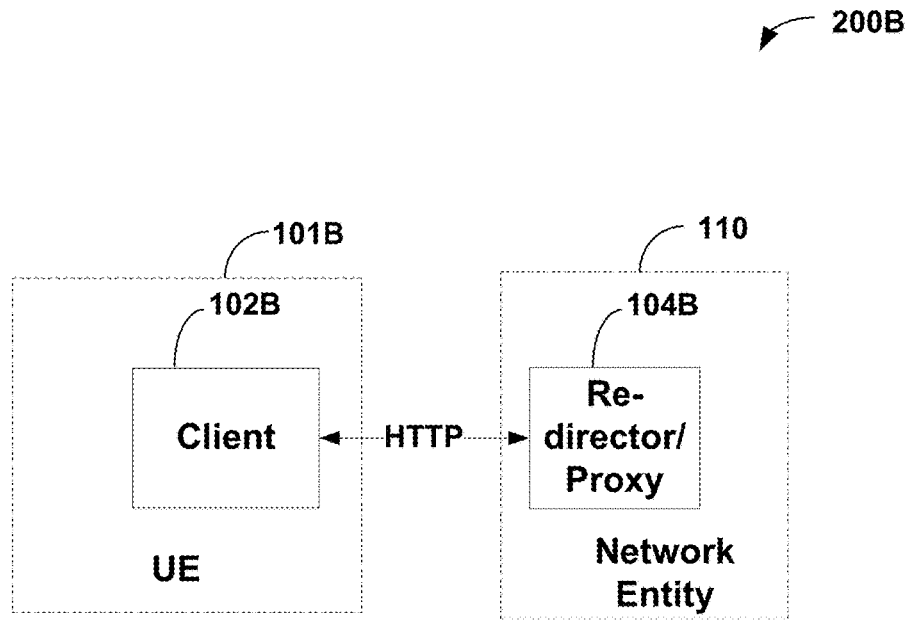

FIGS. 2A-2B illustrate alternative examples of apparatuses including a re-director/proxy 104 for supporting transport diversity. Any or all of the re-director/proxy 104, controller 106 with policy database 108, or transport middleware 110 may be co-located with the application 101 and client on a device or may be located on separate device(s). In the example of FIG. 2A, the system 200A includes the re-director/proxy 104A which is shown co-located with the client and application 101 on a UE 101A. For example, the application service client 102A may be a DASH client, HTTP Live Streaming (HLS), Apple Live Streaming (ALS) client, Adaptive HTTP Streaming (AHS) client, or any other suitable client. The application service client 102A may communicate with re-director/proxy 104A via HTTP, API, IPC, or any other suitable protocol or manner. In the example of FIG. 2B, the system 200B includes the re-director/proxy 104B which is shown located on a separate entity 110 as the application service client 102B and application 101 which are located in a UE 101B. For example, the application service client 102B may be a DASH client, HLS (ALS) client, AHS client, or any other suitable client. The application service client 102B may communicate with the re-director/proxy 104B via HTTP, or any other suitable protocol or manner. The re-director/proxy 104B may be located on any suitable network entity such as a proxy server, gateway, router, etc.

Figure 3:
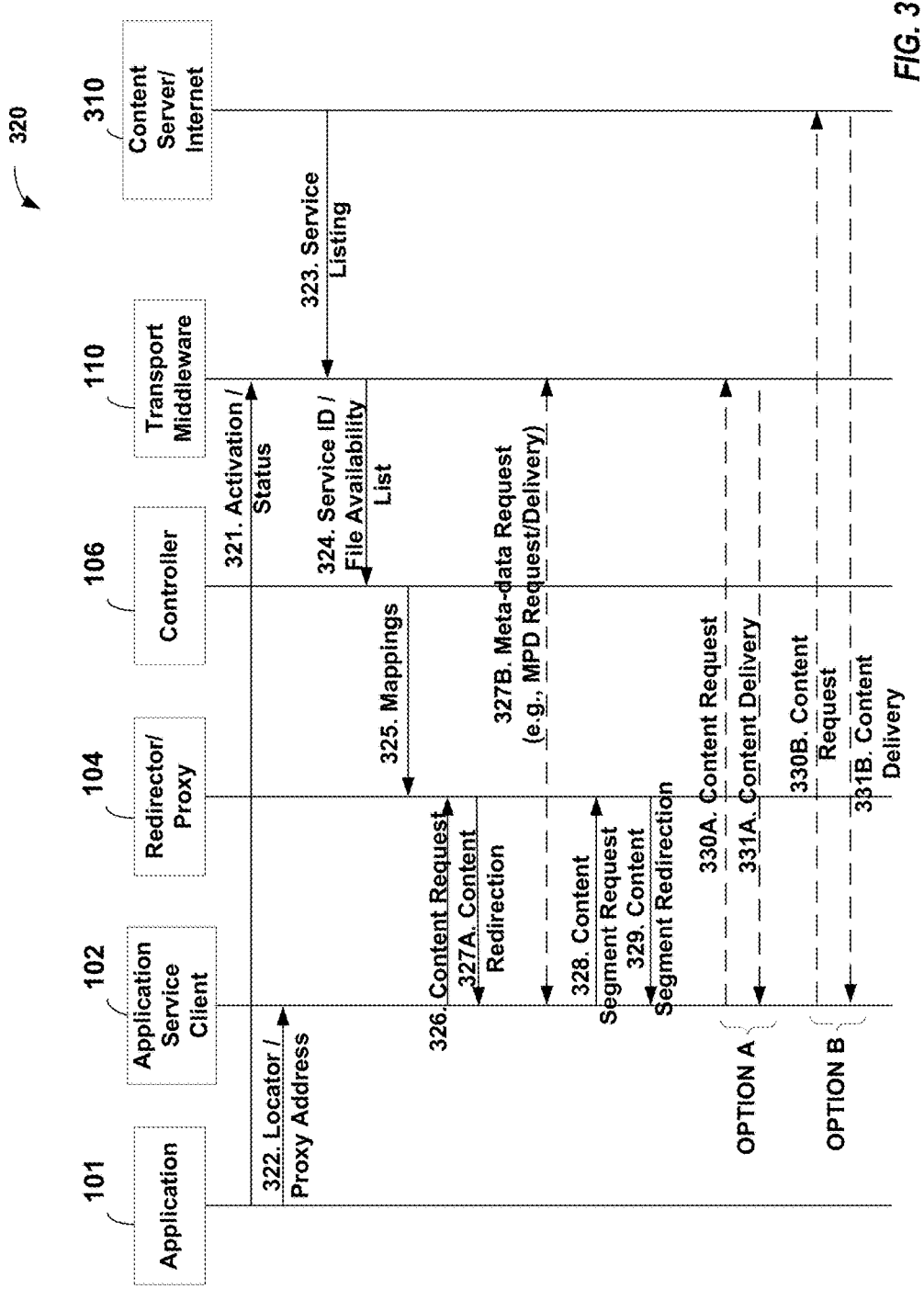
FIG. 3 illustrates aspects of an example process flow using a re-director/proxy configured for re-direction operation.

FIG. 3 is a flow diagram illustrating aspects of an example process flow 320 using a re-director/proxy configured for re-direction operation. Prior to initiation of the process flow 320, the policy database 108 (coupled to the controller 106) may be provided or pre-configured with policy information for determining the actions of the controller 106. The policy database 108 may be provided with the information at provisioning time.

The application 101, which may or may not be related to application 101 in FIG. 1, may be a provisioning application. Application 101 may be configured to activate the transport middleware 110 (321), as well as determine status for transport middleware 110. Application 101 may be configured to activate one or more transport mechanisms of the transport middleware 110. Application 101 may initially configure application service client 102 with information identifying a proxy endpoint (e.g., a host name or address, protocol, or protocol port number) at startup (322).

In this example, more than one transport may be available and various content may be available over the various transports at different times. In particular, various services may be available, where the various services may each define different respective types of transports, such as broadcast, multicast, unicast, or the like, for transporting media data. For example, the eMBMS and/or one or more of the DVB-family of transports may be available. Further, the available media content (e.g., files) may be expressed using, e.g., an application service description. One example of an application service description is an MBMS user service description (USD) metadata fragment, such as an MPD fragment in the case of DASH content delivered as an MBMS User Service, in describing the various available media components. Another example of an application service description is an Apple HLS (HTTP Live Streaming) manifest file, in the case of HLS content delivered as MBMS User Service. Each transport mechanism may have a corresponding module capable of acquiring the list and details of file information and producing a summarizing URI or common URI prefix. These modules may convey this information via a communication mechanism (e.g., IPC, API or other protocol) to the controller 106 which may apply policy and resolution, and which in turn programs the re-director/proxy 104 subject to the policy.

Content server 310 may broadcast (e.g., using LTE RAN, DVB-T, etc.) a service listing (e.g., USD, ESG), which may be received by the transport middleware 110. An appropriate module (e.g., one of Transport A 110A through Transport R 110R) parses the service listing and processes the information into a form which is not transport specific. The transport middleware 110 may convey the results (e.g., an identifier of a service and data defining a list of available files, also referred to as a file availability list) to the controller 106 (324). The controller 106 may process the file availability list in conjunction with the access policy to produce a set of mappings (325). The mappings may include which URIs (or URI prefixes) should be re-directed to which server (e.g., files available over MBMS may be available from the server instantiated within or associated with the MBMS middleware).

Once the application service client 102 is invoked, the application service client 102 may issue a request (e.g., an HTTP request) via the configured proxy address to obtain, e.g., the MPD contents (326). The request may be communicated to the re-director/proxy 104. The re-director/proxy 104 may perform the matching algorithm to determine matching criteria or, if a match does not occur, another indicator (e.g., a default re-direction target, error indication, or copy of the original request). Redirector/proxy 104 may then provide a re-direction target or error to the application service client 102, e.g., using HTTP (327A). The application service client 102, having observed a code (e.g., HTTP code) indicating re-direction (e.g., 3xx type code) responds depending on the code type. For example, code types other than 300 include an HTTP "Location:" header that may indicate the alternate location for a resource. Upon receiving such an indication, the application service client 102 may re-try its request using the alternate location indicated. In this example, the re-director/proxy 104 indicates a particular URI should be directed to the server integrated within the MBMS middleware. Accordingly, the application service client 102 may submit a request to the transport middleware 110 to obtain, e.g., the MPD (327B) in response to such a redirection code.

Once the application service client 102 has acquired the MPD information, the application service client 102 may determine which media segments to access (e.g., which "representation" in the case of MPEG-DASH) and issue an HTTP-based request (328) to the redirector/proxy 104. Using the mechanism described above (e.g., the type of transport associated with the service identified by the service ID), the re-director/proxy 104 may provide a redirect target (329) to the application service client 102. The target may be a default value, a copy of the request (indicating the application service client 102 should handle the request), or a reference to a different server. The targets then serve as the locations used by the application service client 102 to obtain media segments. That is, assuming that the content is available using the service, the application service client 102 may submit a content request to the transport middleware 110 (330A), and in response, the transport middleware 110 may deliver the content to the application service client 102 (331A). For content available through other sources (e.g., when the service is not available), the application service client 102 may obtain the content via other methods (e.g., from other servers, storage/cache or the Internet). For example, the application service client 102 may send a content request to content server 310 (330B), and, in response, the content server 310 may deliver the requested content to the application service client 102 (331B).

In some cases, the URIs requested from the application service client 102, at step 326 or step 328, may be unknown to the re-director/proxy 104. In such cases, errors (e.g., HTTP code 404) may be generated to indicate to the application service client 102 that it may try to request a different segment or stop using the re-director/proxy 104 (e.g., use a direct Internet access request instead). Alternatively, the re-director 104 may use a location header equivalent to the incoming request to suggest non-proxy operation. Another aspect may involve the re-director/proxy 104 acting as a proxy or web proxy, in which case it may access the Internet or another network or cache on behalf of the application service client 102, e.g., as illustrated below in example process flow 400 of FIG. 4.

For the 300-type HTTP error codes, the application service client 102 may be presented with a vector of choices that may not be present in the "Location:" header. In this case, the application service client 102 may choose among the multiple choices provided and, depending on the particulars of the media encoding format, re-initialize its decoding state. The scenario may arise, for example, if a re-direction occurs in the middle of a playback scenario to a representation encoded in a way other than that which the application service client 102 has been processing so far.

Whichever process the application service client 102 uses to select its next media request(s)/access(es), the application service client 102 may initiate the request(s)/access(es) based on the re-directed information. Subsequent requests/access may pass through the re-director initially, providing the opportunity for the re-director to intervene and effectively modify the location (and other characteristics) from which segments (e.g., meta-data and/or media segments stored as files) are retrieved.

Figure 4:
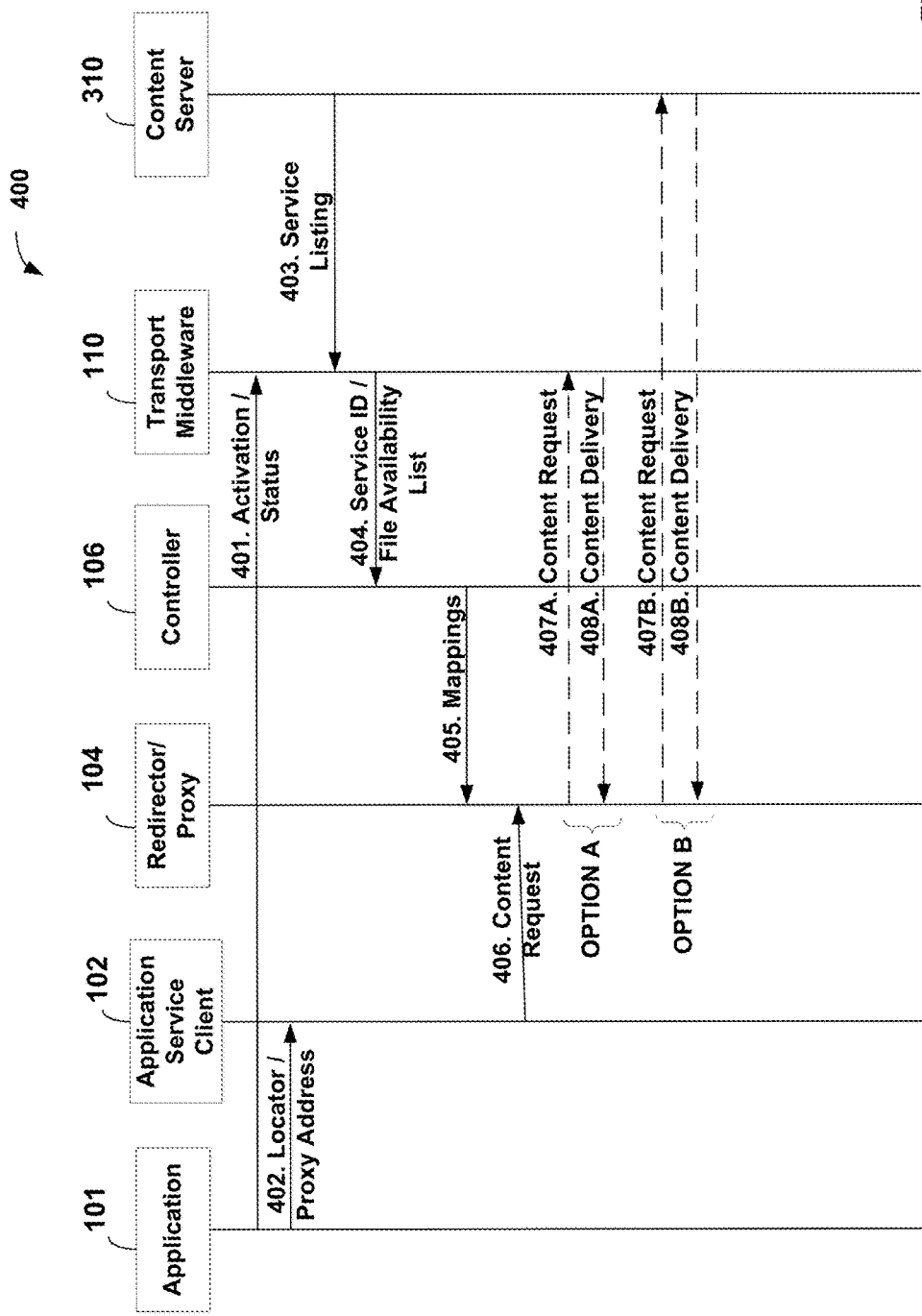
FIG. 4 illustrates aspects of a method using a re-director/proxy configured for proxy operation.

FIG. 4 is a flow diagram illustrating aspects of an example process flow 400 using a re-director/proxy configured for proxy operation. Prior to initiation of the process flow 400, the policy database 108 (coupled to the controller 106) may be provided or pre-configured with policy information for determining the actions of the controller 106. The policy database 108 may be provided with the information at provisioning time.

The application 101 may be a provisioning application. Although described with respect to application 101 of FIG. 1, it should be understood that the application need not be the same as that described with respect to FIG. 1. Application 101 may be configured to activate the transport middleware 110 (401). Application 101 may be configured to activate one or more transport mechanisms of the transport middleware 110. The application service client 102 may initially be configured with information identifying a proxy endpoint (e.g., a host name or address, protocol, or protocol port number) at startup by the application 101 (402).

In this example, more than one transport mechanism may be available and various media may be available over the various transports at different times. The various types of transports may be defined by respective services. For example, the eMBMS and/or one or more of the DVB family of transports may be available. Further, the available media files may be expressed using, e.g., the MPD fragment of the eMBMS USD, and via DVB electronic service guide (ESG) for DVB transport. Each transport mechanism, represented by the transport middleware 110, may have a corresponding module capable of acquiring a list of available services and details of file information and for producing a summarizing URI or common URI prefix. These modules may convey this information via a communication mechanism (e.g., IPC, API or other protocol) to the controller 106 which may apply policy and resolution, and which in turn programs the re-director/proxy 104 subject to the policy.

Content server 310 may broadcast a service listing (e.g., USD, ESG) and received by the transport middleware 110 (403). An appropriate module (e.g., one of Transport A 110A through Transport R 110R) parses the service listing and processes the information into a form which is not transport specific. The transport middleware 110 may convey the results to the controller 106 (404). The controller 106 may process the file availability list in conjunction with the access policy to produce a set of mappings (405). The mappings may include which URIs (or URI prefixes) should be re-directed to which server instantiated (e.g., files or media available over MBMS may be available from the server instantiated within or associated with the MBMS middleware).

Once the application service client 102 is invoked, the application service client 102 may issue a request (e.g., an HTTP request) via the configured proxy address to obtain, e.g., the MPD contents (406). The request may be communicated to the re-director/proxy 104. The re-director/proxy 104 may perform the matching algorithm to determine matching criteria or, if a match does not occur, another indicator (e.g., a default re-direction target, error indication, or copy of the original request). In the case of an error, the error may be provided to the application service client 102. If a match occurs, the re-director/proxy 104 may act as a proxy and retrieve the content on behalf of the application service client 102. The targets then serve as the locations used by the re-director/proxy 104, acting as a proxy, to obtain media segments. That is, the redirector/proxy 104 may submit a content request to the transport middleware 110 (407A), and the transport middleware may deliver the content to the redirector/proxy 104 (408A). For content available through other sources, the re-director/proxy 104, acting as a proxy, may obtain the content via other servers, from storage/files or the Internet. That is, the redirector/proxy 104 may submit a content request to content server 310 (407B), and the content server 310 may deliver the requested content to the redirector/proxy (408B).

Figure 5:
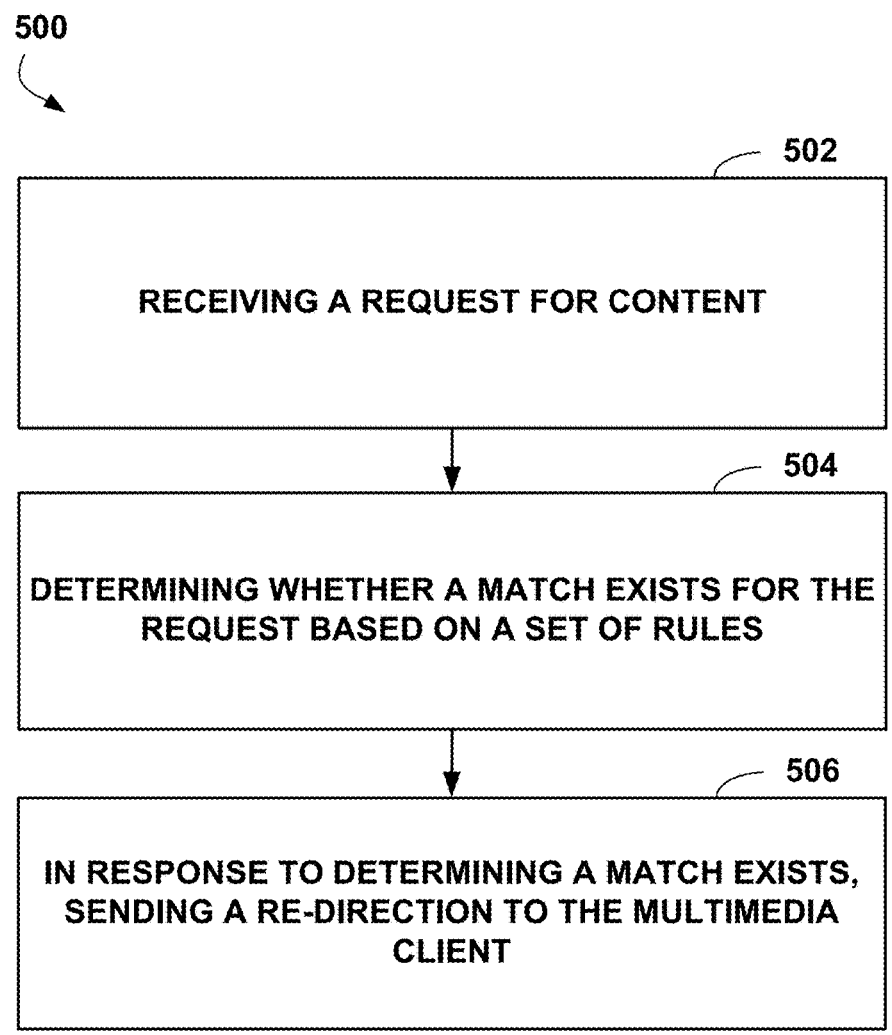
FIG. 5 illustrates examples of a methodology for supporting transport diversity.

FIG. 5 is a flowchart illustrating an example method for supporting transport diversity associated with multimedia content for a multimedia client of a wireless communications network (WCN). The multimedia client may be, or may include, a mobile entity. The method 500 may include receiving a request for content, at 502. The method 500 may include determining whether a match exists for the request based on a set of rules, at 504. The method 500 may include in response to determining a match exists, sending a re-direction to the multimedia client, at 506.

Figure 6:
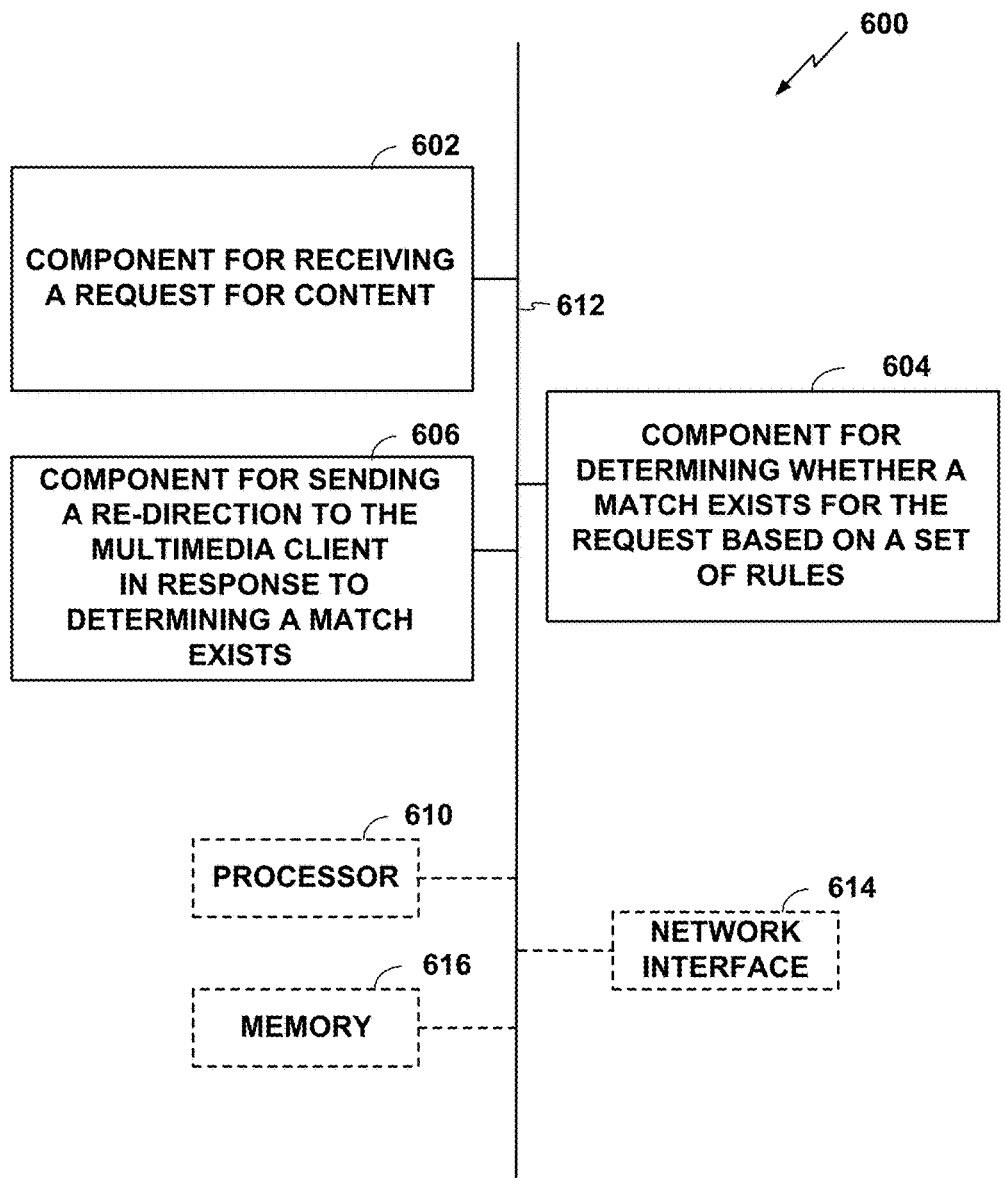
FIG. 6 illustrates an example apparatus for implementing the methodology of FIG. 5.

FIG. 6 is a block diagram illustrating an example apparatus 600 that may be configured as a UE, network entity, or other suitable entity, or as a processor, component or similar device for use within the UE, network entity, or other suitable entity, for supporting transport diversity associated with multimedia content for a multimedia client of a wireless communications network (WCN). The apparatus 600 may include functional blocks that can represent functions implemented by a processor, software, or combination thereof (e.g., firmware).

As illustrated, in one example, the apparatus 600 may include an electrical component or module 602 for receiving a request for content. The apparatus 600 may include an electrical component or module 604 for determining whether a match exists for the request based on a set of rules. The apparatus 600 may include an electrical component or module 606 for sending a re-direction to the multimedia client in response to determining a match exists.

In related aspects, the apparatus 600 may optionally include a processor component 610 having at least one processor, in the case of the apparatus 600 configured as a network entity. The processor 610, in such case, may be in operative communication with the components 602-606 or similar components via a bus 612 or similar communication coupling. The processor 610 may effect initiation and scheduling of the processes or functions performed by electrical components or modules 602-606.

In further related aspects, the apparatus 600 may include a network interface component 614 for communicating with other network entities. The apparatus 600 may optionally include a component for storing information, such as, for example, a memory device/component 616. The computer readable medium or the memory component 616 may be operatively coupled to the other components of the apparatus 600 via the bus 612 or the like. The memory component 616 may be adapted to store computer readable instructions and data for performing the activity of the components 602-606, and subcomponents thereof, or the processor 610. The memory component 616 may retain instructions for executing functions associated with the components 602-606. While shown as being external to the memory 616, it is to be understood that the components 602-606 can exist within the memory 616.

Figure 7:
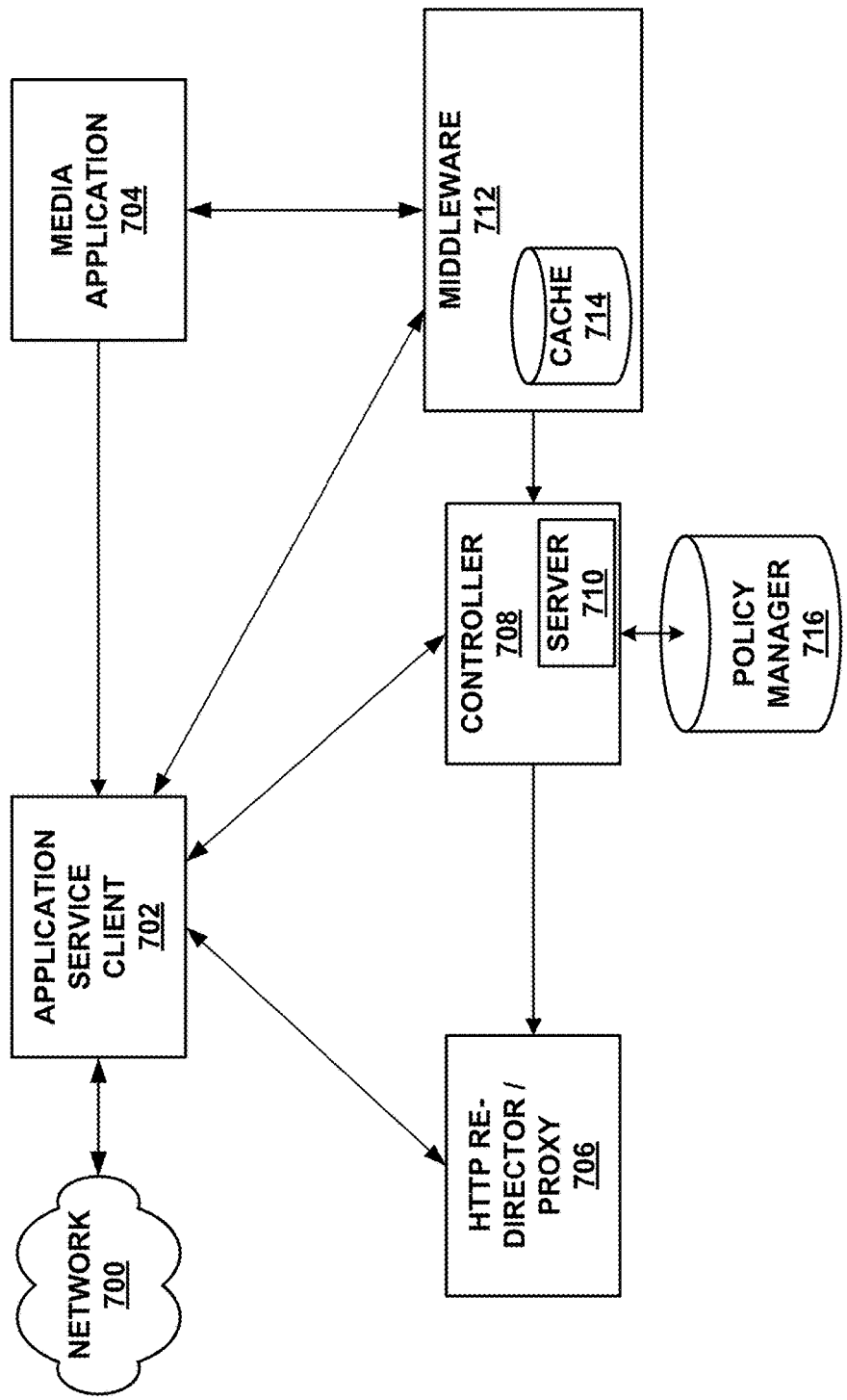
FIGS. 7 and 8 illustrate further aspects for supporting transport diversity.
Figure 8:
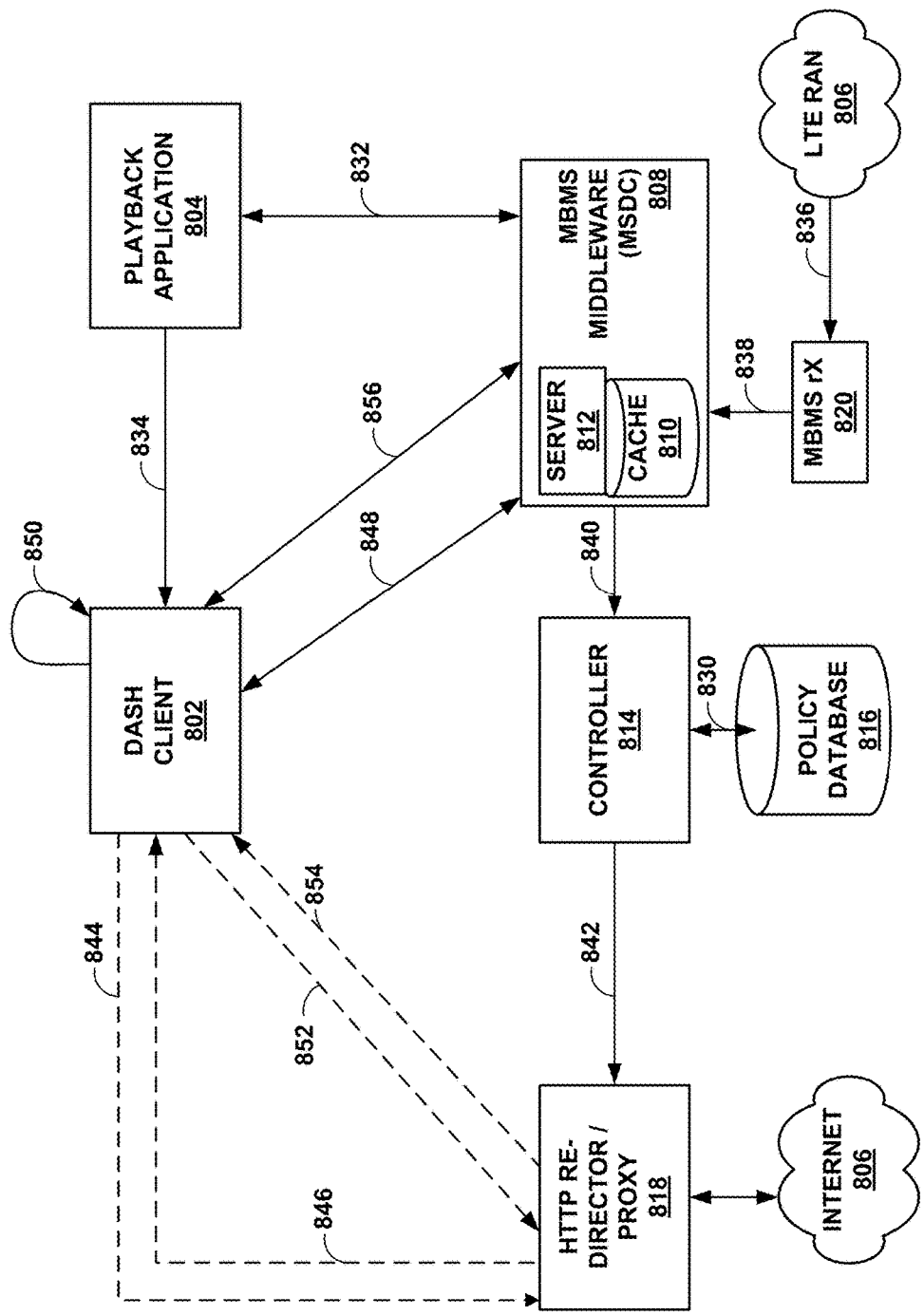

FIGS. 7 and 8 are block diagrams that illustrate further aspects for supporting transport diversity. The components of FIGS. 7 and/or 8 may correspond substantially to the components of FIG. 1 described above. FIG. 7, for example, illustrates network 700, application service client 702, media application 704, HTTP redirector/proxy 706, controller 708, middleware 712, and policy manager 716. Media application 704 is generally responsible for selecting media content (e.g., in response to a user's selection), and application service client 702 is configured to retrieve the selected media content and provide the retrieved media content to media application 704 for playback. Application service client 702 may comprise, for example, a DASH client configured to utilize HTTP to stream media data.

As discussed above with respect to FIG. 1, application service client 702 may retrieve media data either directly from network 700 or from middleware 712. For example, when a service supporting broadcast or multicast is available (e.g., as determined by controller 708 and defined by policies stored by policy manager 716), middleware 712 may receive media data and store the received media data within cache 714. Application service client 702 may issue requests for media data to HTTP redirector/proxy 706. When the requested media data has been received by middleware 712, HTTP redirector/proxy 706 may redirect a request for the media data to middleware 712. Thus, application service client 702 may issue an HTTP request to middleware 712, which may provide the media data to application service client 702. On the other hand, when middleware 712 has not received the media data, HTTP redirector/proxy 706 may redirect application service client 702 to a network location of a server from which the media data is available, where the server may be available via network 700.

FIG. 8, as another example, illustrates DASH client 802, playback application 804, HTTP redirector/proxy 818, controller 814, MSDC 808, MBMS transmission unit 820, and policy database 816. These components may correspond substantially to the similarly named components in FIGS. 1 and/or 7. In general, the techniques of FIG. 8 are discussed as utilizing DASH (which in turn utilizes HTTP), but it should be understood that other streaming protocols may be used as well. Alternative examples are discussed below with respect to RTP/RTSP, for instance.

Initially, policy information may be provided to the system including DASH client 802, playback application 804, HTTP redirector/proxy 818, controller 814, and MSDC 808. Such policy information may be stored within policy database 816 (830). This policy information may influence the action of controller 814. Controller 814 may be implemented in hardware, software, firmware, or any combination thereof. It is presumed that, when implemented in software and/or firmware, requisite hardware may is also provided, such as one or more hardware-based processing units for executing instructions of software corresponding to controller 814.

Initially, playback application 804 may provision identifying information, such as information identifying a proxy endpoint (e.g., host name or address, protocol, and protocol port number) (832). This information may be provided by an optional provisioning application. DASH client 802 may be configured with the identifying information (834).

In the example of FIG. 8, more than one transport may be available and various media (e.g. in files) may be available over the various transports at different times. Consider, for example, that the eMBMS and DVB transports are available. Further consider that the media files available are expressed using an application service description. Each transport may have a corresponding module capable of acquiring the list and details of media information and producing a summarizing URI or common URI prefix, as shown by transport modules 110A-110R of FIG. 1. Only MSDC 808 is shown in the example of FIG. 8, but it should be understood that MSDC 808 may include multiple respective transport modules. These modules convey the file information via a communication mechanism (e.g., IPC, API or protocol) to controller 814, which may apply policy and resolution, and which in turns programs the re-director subject to policy. FIG. 8 depicts only the portions for MBMS (to limit clutter). MBMS rX 820 may receive the USD (836), and parse/deliver the USD to MSDC 808 (838).

MSDC 808 processes the USD-specific information into a form which is not transport-specific and conveys the results to controller 814 (840). Controller 814 may then process the file availability list in conjunction with the access policy to produce a set of mappings (842). The mappings indicate which URIs (or URI prefixes) should be re-directed to which server instantiated (e.g., files available over MBMS may be available from server 812, instantiated within or associated with MSDC 808). In other words, HTTP redirector/proxy 818 may obtain mapping information that maps an identifier for media data to a resource location based on a service for retrieving the media data, wherein the service defines at least one of a plurality of types of transports (e.g., broadcast, unicast, or multicast) for transporting the media data. For example, the service may define broadcast or multicast transport types for transporting the media data, in which case MSDC 808 may receive the data. MSDC 808 may store received media data in cache 810, for subsequent retrieval by, e.g., DASH client 802, as discussed below.

Once invoked, DASH client 802 may issue an HTTP request via the configured proxy address (to HTTP redirector/proxy 818) to obtain the MPD contents (844). Likewise, HTTP redirector/proxy 818 may receive the HTTP request from DASH client 802. The HTTP request may be a request for media data. HTTP redirector/proxy 818 may perform the matching algorithm to determine matching criteria or, if a match does not occur, another indicator (e.g., a default re-direction target, error indication, or copy of the original request). Thus, using the matching criteria on the mapping information, HTTP redirector/proxy 818 may determine whether a particular service is available, e.g., a service defining broadcast or multicast for transporting the requested media data. HTTP redirector/proxy 818 may then provide a re-direction target or error to DASH client 820 using HTTP (846), based on the matching algorithm.

DASH client 802, having observed an HTTP code indicating a re-direction (e.g., a 3xx type HTTP code) may respond depending on the code type. For types other than 300, an HTTP "Location:" header may indicate the alternate location for a resource. Upon receiving such an indication, DASH client 802 may re-try its request using the indicated alternative location. In this example, HTTP re-director/proxy 818 may indicate that a particular URI should be directed to the server integrated within MSDC 808, from which DASH client 802 may obtain the MPD (848).

Once DASH client 802 has acquired the MPD information, DASH client 802 may determine what media files to access (e.g., which "representation" in the case of MPEG-DASH) and issue one or more HTTP-based requests to retrieve the determined media files (852). Using the mechanism described above, HTTP redirector/proxy 818 provides a redirect target to DASH client 802 (854). The target may be a default value, a copy of the request (indicating the client should handle the request), or a reference to a different server. The targets then serve as the locations used by DASH client 802 to obtain media segments, e.g., from MSDC 808 (856). In this manner, when a service defining, e.g., broadcast or multicast for transporting media is available, HTTP redirector/proxy 818 may cause DASH client 802 to receive the requested media data from a unit (e.g., MSDC 808) that receives the media data using the service from the resource location indicated in the mapping information. Alternatively, the redirection target may correspond to a network location available via some network, including Internet 806.

In some cases, the URIs requested from the client (steps 844/852) may be unknown to HTTP redirector/proxy 818. In such cases, errors (e.g., HTTP code 404) could be generated to indicate to DASH client 802 that DASH client 802 should try to request a different segment or change to not use HTTP redirector/proxy 818 (i.e., instead use a direct network or Internet access request). Alternatively, HTTP redirector/proxy 818 may use a Location: header equivalent to the incoming request to suggest non-proxy operation. One further variant would involve HTTP redirector/proxy 818 acting as a conventional web proxy, in which case HTTP redirector/proxy 818 may access Internet 806 on behalf of DASH client 802.

In this manner, the techniques of FIG. 8 represent an example of a method including, by a proxy unit (e.g., HTTP redirector/proxy 818), obtaining mapping information that maps an identifier for media data to a resource location based on a service for retrieving the media data, wherein the service defines at least one of a plurality of types of transports (e.g., broadcast, multicast, or unicast) for transporting the media data, receiving a request for the media data from an application service client (e.g., DASH client 802), determining whether the service is available, and, when the service is available, causing the application service client to receive the media data from a unit that receives the media data using the service from the resource location, based on the mapping information. The unit that receives the media data, in this example, corresponds to MSDC 808.

Furthermore, if the resource location corresponds to a network location (e.g., a location within or accessible via Internet 806), HTTP redirector/proxy 818 may be configured to determine whether media data specified in a request matches media data in mapping information, and when the media data specified in the request matches the media data in the mapping information, send a redirect message to the application service client specifying the network location to which the identifier for the media data is mapped in the mapping information to cause the application service client to retrieve the media data from the network location.

Likewise, HTTP redirector/proxy 818 represents an example of a proxy unit configured to obtain mapping information that maps an identifier for media data to a resource location based on a service for retrieving the media data, wherein the service defines at least one of a plurality of types of transports (e.g., broadcast, multicast, or unicast) for transporting the media data, receive a request for the media data from an application service client, determine whether the service is available, and, when the service is available, cause the application service client to receive the media data from a unit that receives the media data using the service from the resource location, based on the mapping information.

Figure 9:
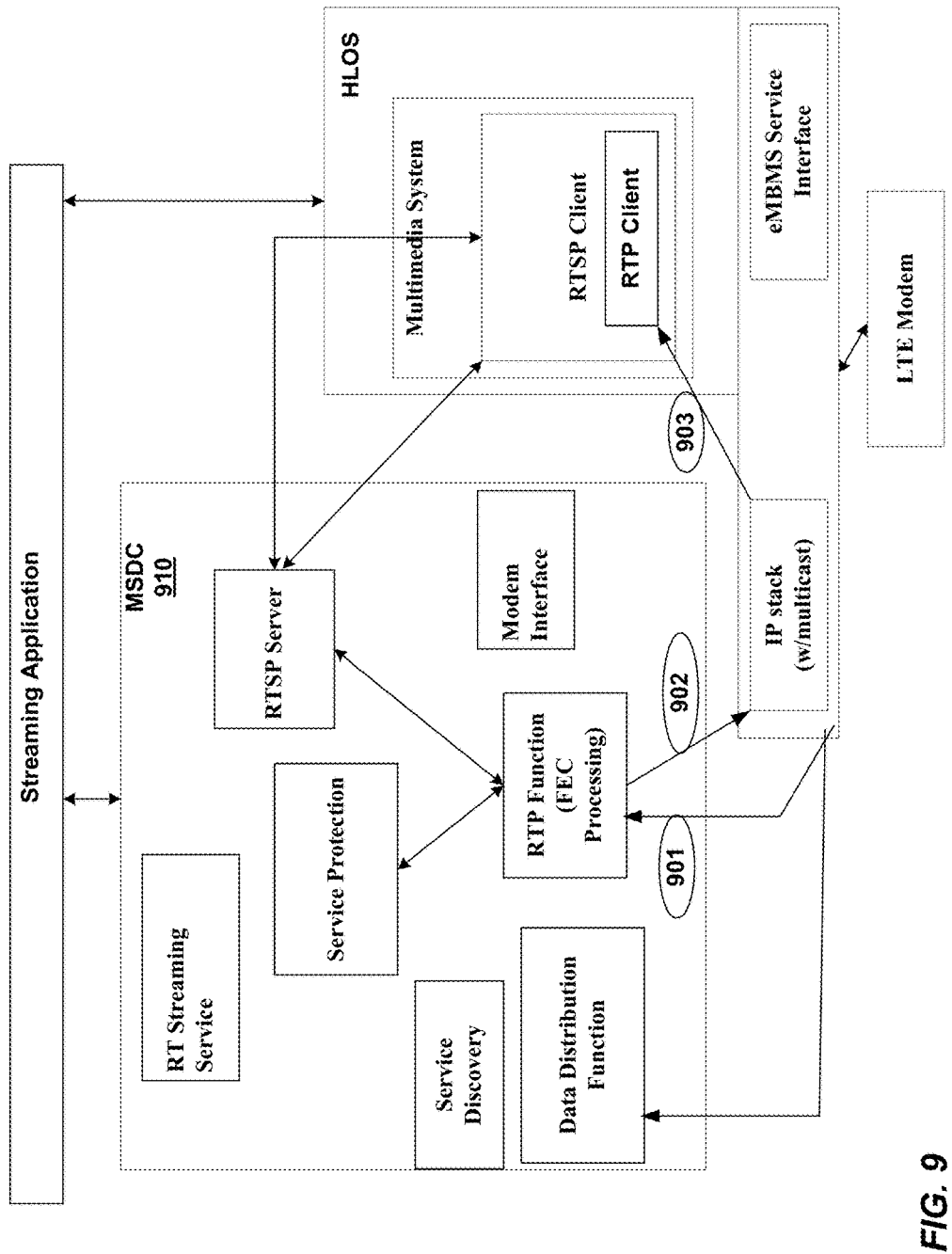
FIGS. 9 and 10 are block diagrams illustrating example multicast services device client (MSDC) architectures for supporting Real-Time Transport Protocol (RTP)/Real-Time Streaming Protocol (RTSP) streaming.
Figure 10:
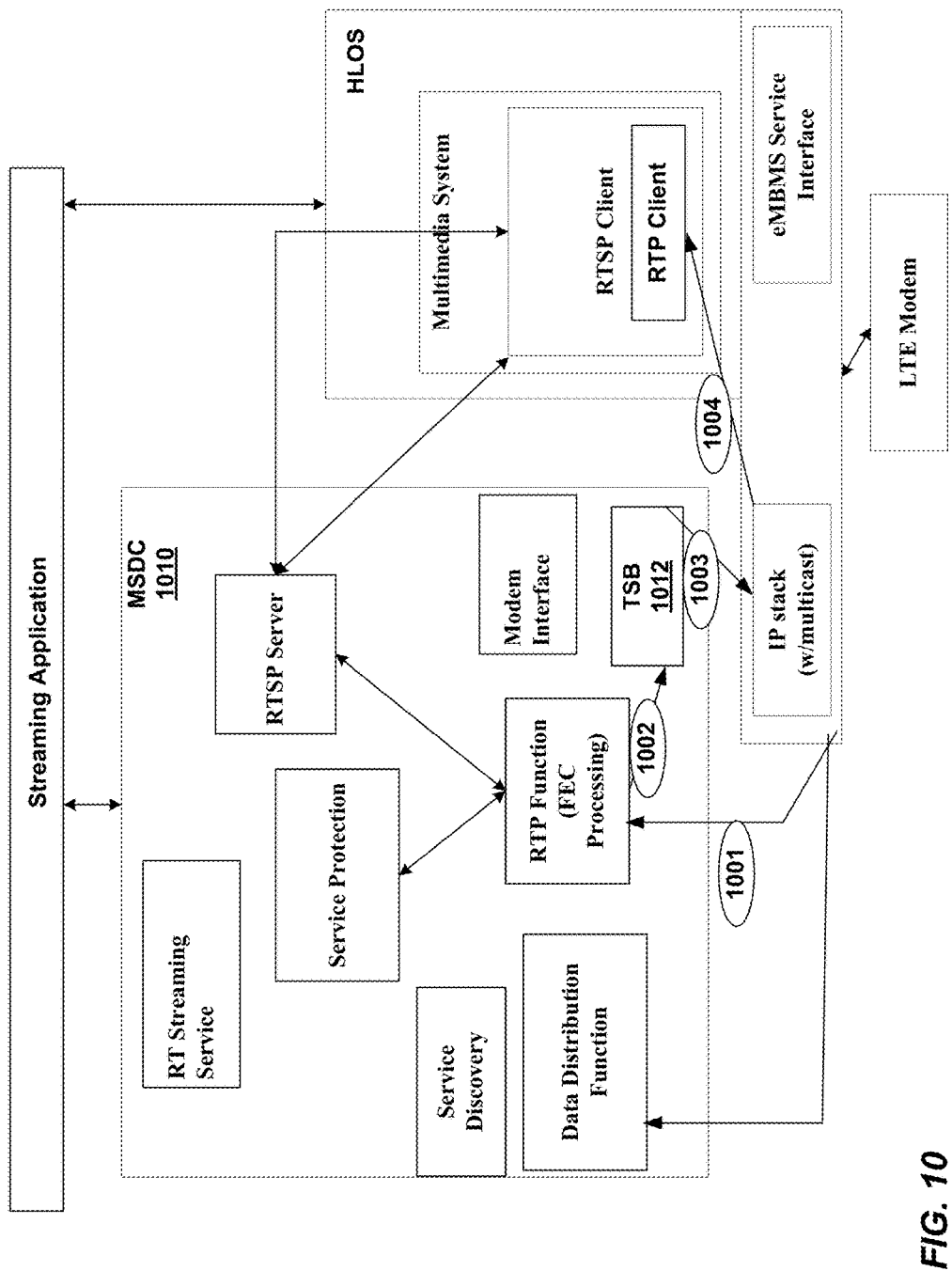

FIGS. 9 and 10 are block diagrams illustrating example MSDC architectures for supporting RTP/RTSP streaming. FIG. 9 shows the architecture without the TSB feature and FIG. 10 shows the architecture supporting a TSB. In these examples, the TSB will be maintained in the middleware. The numbered arrows indicate the data flow from a network layer to middleware and eventually to the RTSP/RTP client. In particular, data received by the LTE modem is provided to the IP stack, which supports multicast (or broadcast). The IP stack provides the received data to a Real-time Transport Protocol (RTP) function of the MSDC middleware (901), which performs forward error correction (FEC) processing on the data. The data is then provided back to the IP stack (902). The IP stack then provides the data to the RTP client (903).

In the example of FIG. 10, MSDC 1010 may support TSB 1012. Thus, in the example of FIG. 10, data received by the LTE modem is provided to the IP stack, which supports multicast (or broadcast). The IP stack provides the received data to a Real-time Transport Protocol (RTP) function of MSDC 1010 (1001), which performs forward error correction (FEC) processing on the data. The data is then buffered in a time-shifted buffer (TSB) 1012 (1002). The IP stack may then receive the data from TSB 1012 (1003) at an appropriate time and provide the data to the RTP client (1004).

In addition, as described in greater detail below, MSDC 1010 may receive an SDP message including an attribute that defines a time-shifted buffer (TSB) depth for TSB 1012 of FIG. 10. MSDC 1010 may determine an amount of memory for TSB 1012 based on a value of the attribute as signaled in the SDP message. For example, the value of the attribute may define a length of the TSB, e.g., in terms of seconds of playback for media data to be stored in TSB 1012. Thus, MSDC 1010 may determine the amount of memory to be allocated to form TSB 1012 based on, e.g., a frame rate for video data of the media data to be received and on the number of seconds of playback to be potentially buffered in TSB 1012. MSDC 1010 may then allocate the determined amount of memory for TSB 1012 and store at least a portion of received media data, associated with the SDP message, in TSB 1012.

In order to signal the TSB depth, the techniques of this disclosure may be used to leverage the extension mechanism of SDP. SDP "a=" (attribute) lines may be used for providing extensions to the general session description. The following semantics may be used to signal data related to the TSB, as one example:

TSB-attribute="a=tsb-length:" Value
Value=token
    Value will have seconds as unit As an example, the following SDP snippet mentioned in Table 1 describes data for the TSB. The buffer depth in this example is 60 seconds, or 1 minute. This implies that the MSDC (e.g., the TSB of the MSDC illustrated in FIG. 10) will maintain 1 minute worth of media content in its time-shifted buffer. The underlined text represents an example attribute in the form of an "a=" line, in accordance with the techniques of this disclosure, related to the TSB.

TABLE 1 v=0
s=RTSP session
c=IN IP4 127.0.0.1/1
a=3GPP-QoE-Metrics:metrics={Network_Resource|Loss_Of_Objects};
rate=End;resolution=60
t=0 0
a=rtsp://localhost:554/concert
a=tsb-length: 60
a=control:trackID=1
m=audio 5676 RTP/AVP 0
a=control:trackID=2
m=video 5677 RTP/AVP 31

When data for the TSB is provided in the SDP, the MSDC may allocate an equivalent amount of buffer of the size mentioned in the SDP, and may allow the RTSP/RTP client to fast-forward or rewind playback, with respect to the buffer duration.

One example technique for achieving transport diversity is based upon the solution proposed by U.S. Provisional Application Ser. No. 61/752,456, "ARCHITECTURE SUPPORTING TRANSPORT DIVERSITY," to Fall et al., filed, Jan. 15, 2013, attorney docket no. 131286P1 (hereinafter, the "Fall provisional application"), the entire contents of which are hereby incorporated by reference. The Fall provisional application proposes common client architecture for supporting diverse transport protocols. The techniques of this disclosure for supporting transport diversity in RTP may be used to extend the techniques described in the Fall provisional application, which relates to DASH-based delivery of contents.

Unlike the DASH protocol, where media representations in Media Presentation Description (MPD) may change based on transport delivery methods, RTP protocol conventionally has no way to differentiate the transport diversity via a single SDP profile directly. This disclosure describes to example techniques to achieve transport diversity.

Figure 11:
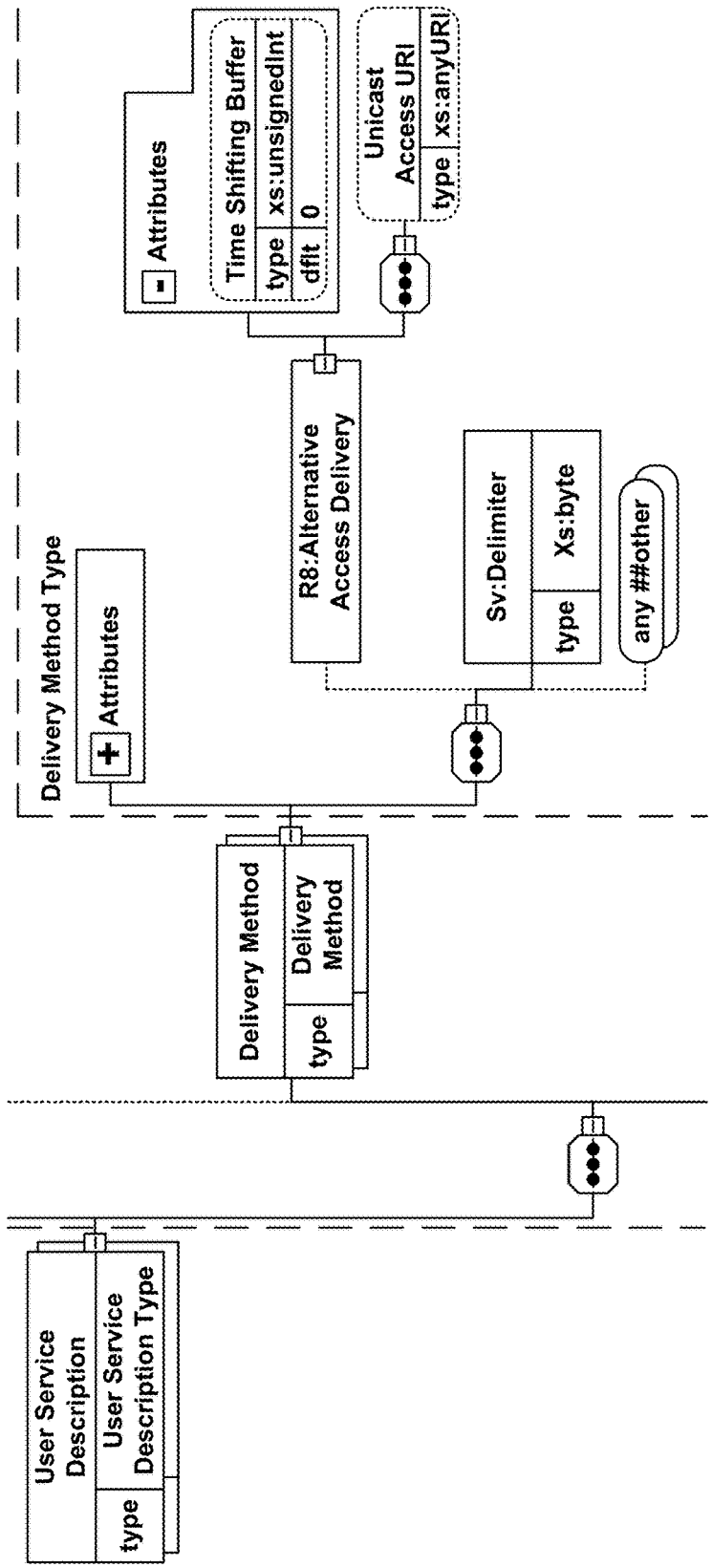
FIG. 11 is a conceptual diagram illustrating an example evolved MBMS (eMBMS) user service description (USD) schema snippet.

As one example, eMBMS broadcast definitions of services allow mechanisms to select between unicast and broadcast transport mechanisms. For example, a delivery-Method element in an eMBMS service definition schema may contain an SDP profile that describes broadcast delivery sessions, while an AlternativeAccessDelivery element may contain references to an RTSP URL for unicast access or PSS SDP file that denotes unicast SDP session information. When a UE is under broadcast network coverage, eMBMS middleware may consume broadcast content using broadcast SDP session information. Otherwise, the middleware may pass the content by connecting to the unicastAccessURI in AlternateAccessDelivery. An example of the eMBMS user service description (USD) schema snippet is shown in FIG. 11.

An alternative example to the deliveryMethod carrying broadcast SDP and unicast access URI is to have a unified single SDP that contains both unicast and broadcast session descriptions in different media streams. Since any session description in SDP can contain multiple media stream definitions (for example, one for an audio track and another for a video track), a mechanism may be used to group broadcast and unicast media streams into different sets to provide a unified SDP profile. This can be achieved by a grouping method in SDP. An example of the grouping mechanism is described as follows:
  Media stream identification
    Identifies media streams within groups
    Media-attribute="a=mid:" Identification-tag
    Identification-tag=token
  Group attribute
    Identifies unicast/broadcast media streams
    Group-attribute="a=group:" Semantics (identification-tag)*
    Semantics="BROADCAST"|"UNICAST"

The following snippet in Table 2 provides an example in which values are provided for group and media stream identifier attributes. In the example below, the "a=group:" lines denote which media streams are used for broadcast and which media streams are used for unicast. In this example, broadcast media streams are denoted by "a=mid:" values 1 and 2 and unicast are denoted by "a=mid:" values 3 and 4, respectively. Therefore, middleware may connect to IP address 224.1.1.2 and ports 30000 and 30002 for broadcast content, and to IP address 131.10.1.2 and ports 26890 and 26892 for unicast streams.

TABLE 2 v=0
t=0 0
c=IN IP4 224.2.17.12/127
a=group:BROADCAST 1 2
a=group:UNICAST 3 4
m=audio 30000 RTP/AVP 0
c=IN IP4 224.1.1.2/127
a=mid:1
m=video 30002 RTP/AVP 31
c=IN IP4 224.1.1.2/127
a=mid:2
m=audio 26890 RTP/AVP 31
c=IN IP4 131.10.1.2/127
a=mid:3
m=video 26892 RTP/AVP 31
c=IN IP4 131.10.1.2/127
a=mid:4

In this manner, FIG. 10 illustrates an example of a device including one or more processors configured to receive a session description protocol (SDP) message including an attribute that defines a time-shifted buffer (TSB) depth, determine an amount of memory for the TSB based on a value of the attribute, allocate the determined amount of memory to the TSB, and store at least a portion of media data associated with the SDP message in the TSB.

Figure 12:
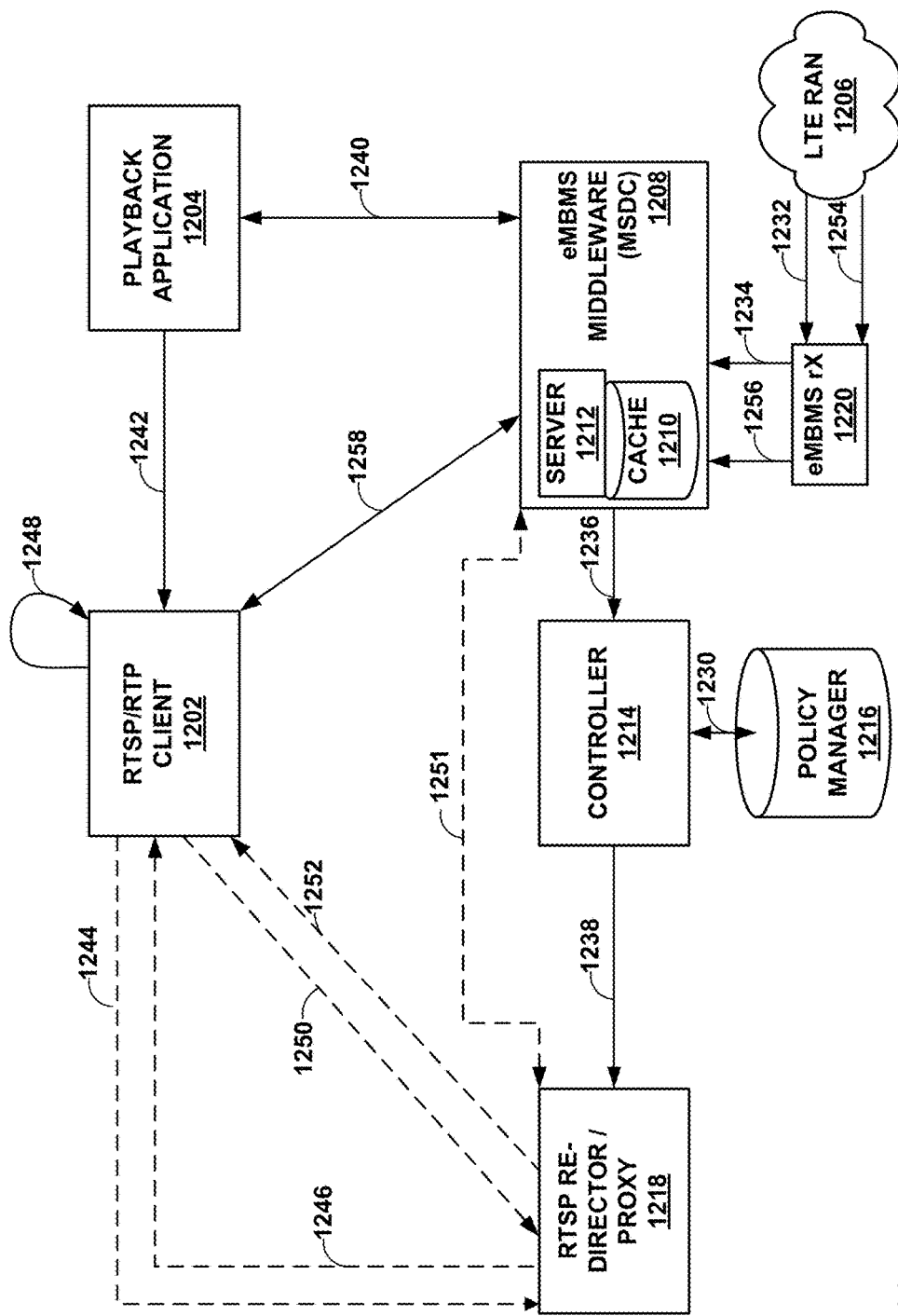
FIGS. 12 and 13 are block diagrams illustrating example components for supporting transport diversity for an RTSP/RTP client.
Figure 13:
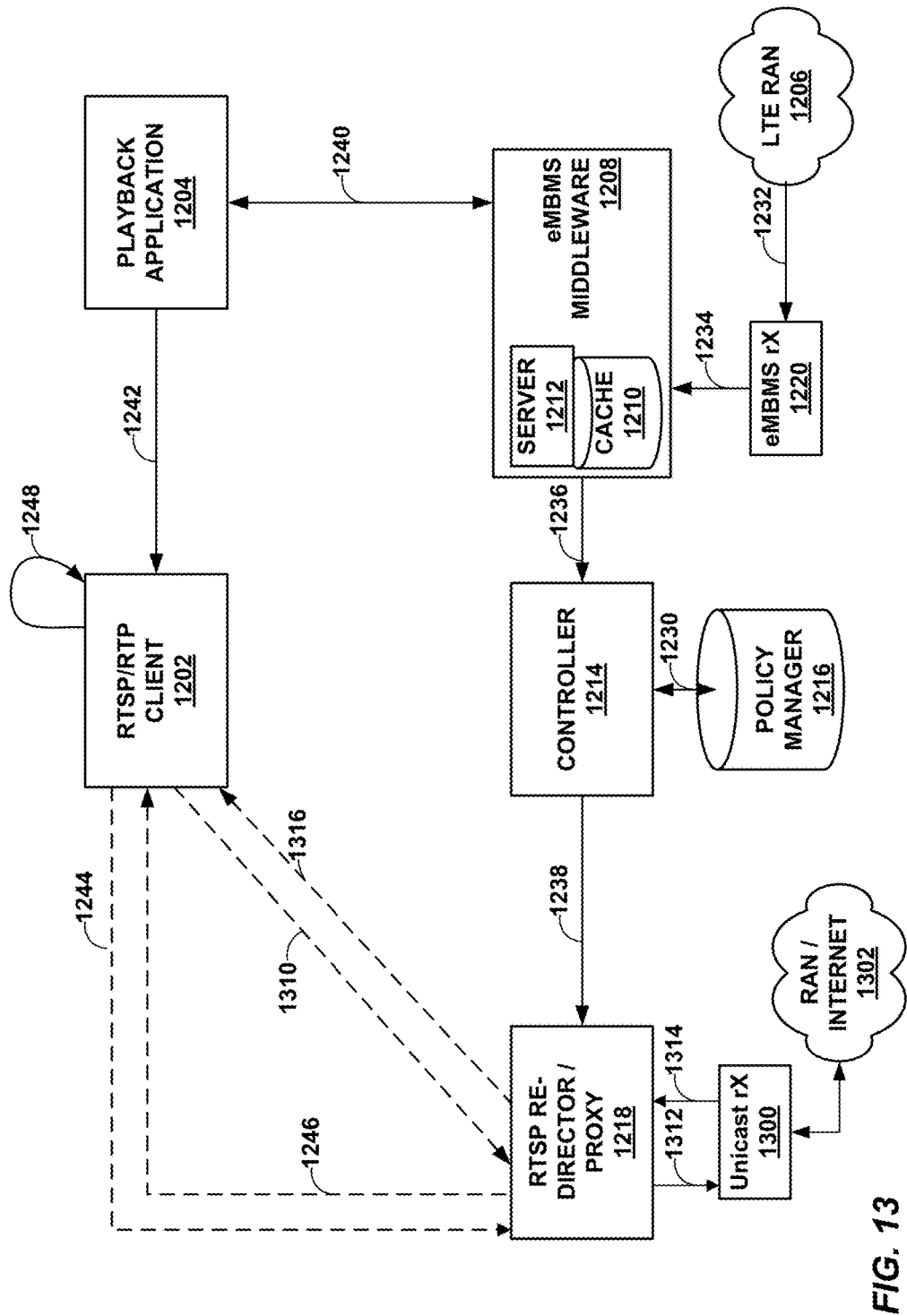

FIGS. 12 and 13 are block diagrams illustrating example components for supporting transport diversity for an RTSP/RTP client. Whether deliveryMethod in an eMBMS USD is used to differentiate between broadcast and unicast transport, or the unified single SDP mechanism is used, the techniques of this disclosure may provide seamless content acquisition by the RTSP/RTP client. In order to achieve that, as proposed in the Fall provisional application, a policy manager, a controller, and an RTSP redirector/proxy may be maintained in UE, possibly outside eMBMS middleware (also referred to as a multicast services device client (MSDC)). When an RTSP client asks for SDP, a RTSP redirector/proxy always provides SDP profiles that carry localhost (e.g., IP version 4 address 127.0.0.1) as the connection endpoint address. The idea is that whether the RTSP redirector/proxy receives content via eMBMS middleware (for broadcast) or a unicast RTSP server (for unicast), it always serves the content to the RTSP/RTP client from the localhost. Therefore, the client is unaware of diversity in the transport mechanism. Below we provide a brief description of the main components of the architecture and give an example of how content is delivered to the client.

In the examples of FIGS. 12 and 13, Playback App is the application that is attempting to consume streaming content; RTSP/RTP Client is the client that implements the RTP protocol for client behavior; eMBMS Middleware is the middleware architecture that implements eMBMS (or MBMS) broadcast service discovery (for streaming or file download) and consumes streaming or file delivery content via broadcast LTE network; Policy Manager maintains a database of policies as discussed above; Controller is a component that gets policy information from the policy manager and eMBMS broadcast coverage indication from the eMBMS middleware and provides a mapping to the RTSP redirector/proxy, stating which SDP profile to choose from (unicast or broadcast); and RTSP Redirector/Proxy is a proxy unit that receives mapping information from the controller and, depending on the mapping, collects RTP content from eMBMS middleware (in case UE is in broadcast coverage) or connects to the unicast RTSP URI and receives content via unicast transport, which it may then pass to the RTSP/RTP Client.

FIG. 12 represents an example procedure for the broadcast delivery of RTP content. FIG. 12 includes RTSP/RTP client 1202, playback application 1204, RTSP redirector/proxy 1218, controller 1214, eMBMS middleware (also referred to as MSDC) 1208, policy manager 1216, and broadcast transmission unit (also referred to as eMBMS rX) 1220. FIG. 12 also depicts Long Term Evolution (LTE) radio access network (RAN) 1206. LTE RAN 1206 provides an MBMS service, which defines at least one of a plurality of types of transports (e.g., broadcast, multicast, or unicast) for media data. Thus, when MSDC 1208 is in a service area of coverage provided by LTE RAN 1206, MSDC 1208 can receive media data via LTE RAN 1206 using broadcast or multicast transport. Furthermore, MSDC 1208 implements server 1212, which includes cache 1210. In this manner, MSDC 1208 can act as both a client that receives media data and a server that provides data to, e.g., RTSP/RTP client 1202. Moreover, RTSP/RTP client 1202 may retrieve media data from, e.g., MSDC 1208 or RTSP redirector/proxy 1218, and then provide the media data to playback application 1204.

Playback application 1204 may correspond substantially to application 101 (FIG. 1), while RTSP/RTP client 1202 may correspond substantially to application service client 102 (FIG. 1). Similarly, MSDC 1208 may correspond substantially to one of transport middleware 110A-110R (FIG. 10). Controller 1214 may correspond substantially to controller 106 (FIG. 1). RTSP redirector/proxy 1218 may correspond substantially to redirector/proxy 104 (FIG. 1).

In this example, the policy manager is provisioned with policies (1230). The eMBMS Middleware (or MSDC) 1208 receives USD descriptions (1232, 1234) for the list of eMBMS services. The MSDC 1208 then passes the SDP profile information for the RTP streaming service and the broadcast coverage notification to the controller 1214 (1236), which in turn matches the SDP information with the list of policies and provides mapping information to the RTSP redirector/proxy 1218 (1238). Mapping information contains data indicating, for each scenario (broadcast or unicast coverage), which SDP profile connection-endpoints to use. In this manner, the RTSP redirector may obtain mapping information that maps an identifier for media data to a resource location based on a service for retrieving the media data. The resource location may correspond to a network address, e.g., an address available via LTE RAN 1206. The service may define at least one of a plurality of types of transports for transporting the media data, e.g., broadcast or multicast.

The MSDC 1208, meanwhile, passes a list of services to the playback application 1204 (1240). The playback application 1204 may correspond to application 101 (FIG. 1). The playback application 1204 then passes the RTSP URI (provided with the list of services from MSDC) and the proxy address to the RTSP/RTP client 1202 (1242). When the RTSP/RTP 1202 client calls DESCRIBE command (an RTSP defined command) (1244), the RTSP redirector/proxy 1218 provides a modified SDP message redirected to local server (1246). The RTSP/RTP client 1202 parses the SDP information (1248) and calls the SETUP command (RTSP command) to set up a RTP session with the local server. The RTSP/RTP client 1202 also passes the PLAY command when setup with the server succeeds (1250). The RTSP redirector/proxy 1218 provides a success message to the SETUP and PLAY request (1252) to the RTSP/RTP client 1202. The SETUP and PLAY commands received by the RTSP redirector/proxy 1218 from RTSP/RTP client 1202 represent an example of a request for media data. In addition, the RTSP redirector/proxy 1218 sends SETUP and PLAY commands to the MSDC 1208 (1251).

RTSP redirector/proxy 1218 may determine whether the service for retrieving media data is available, e.g., whether a service that defines broadcast or multicast as a transport is available. RTSP redirector/proxy 1218 may determine whether the service is available based at least in part on whether RTSP redirector/proxy 1218, or MSDC 1208, is within a service coverage area. The techniques of FIG. 12 presume that the service is available. FIG. 13, as discussed in greater detail below, describes additional techniques that may be employed when the service is not available.

Meanwhile, during the active broadcast session of the streaming service, a network operator sends RTP content over LTE RAN 1206 (1254). MSDC collects RTP content for the service from broadcast connection endpoint (labeled eMBMS rX 1220 in FIG. 12) (1256), processes the content (if needed), and passes the content to the RTSP/RTP client 1202 at an endpoint specified by the client during the SETUP command with the RTSP redirector/proxy (1258). In this manner, when the service is available (e.g., a service defining broadcast or multicast transport), RTSP redirector/ proxy 1218 causes RTSP/RTP client 1202 to receive media data from MSDC 1208 (i.e., a unit that receives the media data using the service from a resource location, e.g., via LTE RAN 1206). In particular, in this example, MSDC 1208 receives media data from a network location via LTE RAN 1206, based on mapping information (e.g., the USD data described above) that maps the service to this location.

In this manner, the techniques of FIG. 12 represent an example of a method including, by a proxy unit (e.g., RTSP re-director/proxy 1218), obtaining mapping information that maps an identifier for media data to a resource location based on a service for retrieving the media data, wherein the service defines at least one of a plurality of types of transports (e.g., broadcast, multicast, or unicast) for transporting the media data, receiving a request for the media data from an application service client (e.g., RTSP/RTP client 1202), determining whether the service is available, and, when the service is available, causing the application service client to receive the media data from a unit that receives the media data using the service from the resource location, based on the mapping information. The unit that receives the media data, in this example, corresponds to MSDC 1208.

FIG. 13 represents an example procedure for the unicast delivery of RTP content. In this example, steps 1232-1248 are substantially the same as the broadcast delivery of content as described with respect to FIG. 12. However, in this case, when RTSP/RTP client calls SETUP and PLAY commands (1310), the RTSP redirector/proxy 1218 contacts a unicast RTSP server via RAN/Internet 1302 from the mapping information (1312), retrieves the contents from the unicast RTSP server (1314), and passes the content to the endpoint mentioned by the RTSP/RTP client 1202 during SETUP command or the ones announced in the SDP at step 1246 (1316). Therefore, in this case, the RTSP redirector/ proxy 1218 (which may be present in user equipment that also includes RTSP/RTP client 1202) acts as client to the remote RTSP server and retrieves the content on RTSP/RTP client's behalf.

In this manner, the techniques of this disclosure may use an SDP extension mechanism (attribute) to provide TSB indication for eMBMS broadcast delivery of RTP content. This disclosure also defines an example architecture to support seamless transition between broadcast and unicast transport, and to provide RTP media content delivery mechanisms within a UE. Moreover, this disclosure describes techniques for grouping of multiple RTP-based media streams for unicast and broadcast delivery of content within an SDP message.

RTSP redirector/proxy 1218 represents an example of a proxy unit that may be configured to obtain mapping information that maps an identifier for media data to a resource location based on a service for retrieving the media data, wherein the service defines at least one of a plurality of types of transports (e.g., broadcast, multicast, or unicast) for transporting the media data, receive a request for the media data from an application service client, determine whether the service is available, and, when the service is available, cause the application service client to receive the media data from a unit that receives the media data using the service from the resource location, based on the mapping information.

Figure 14A:
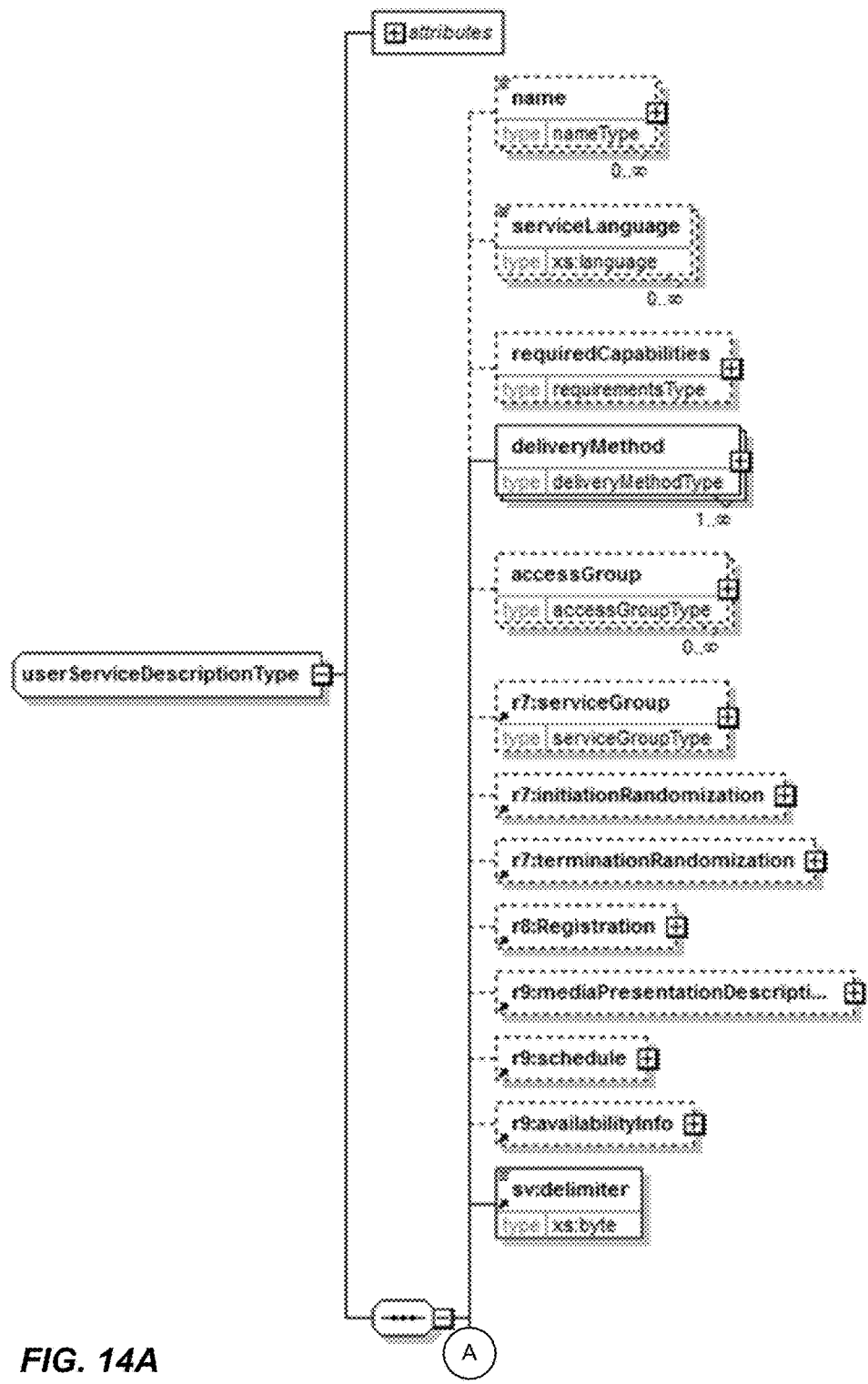
FIGS. 14A and 14B are conceptual diagrams illustrating an example extensible markup language (XML) content model for extending a USD to carry dynamic adaptive streaming over HTTP (DASH) Transport information.
Figure 14B:
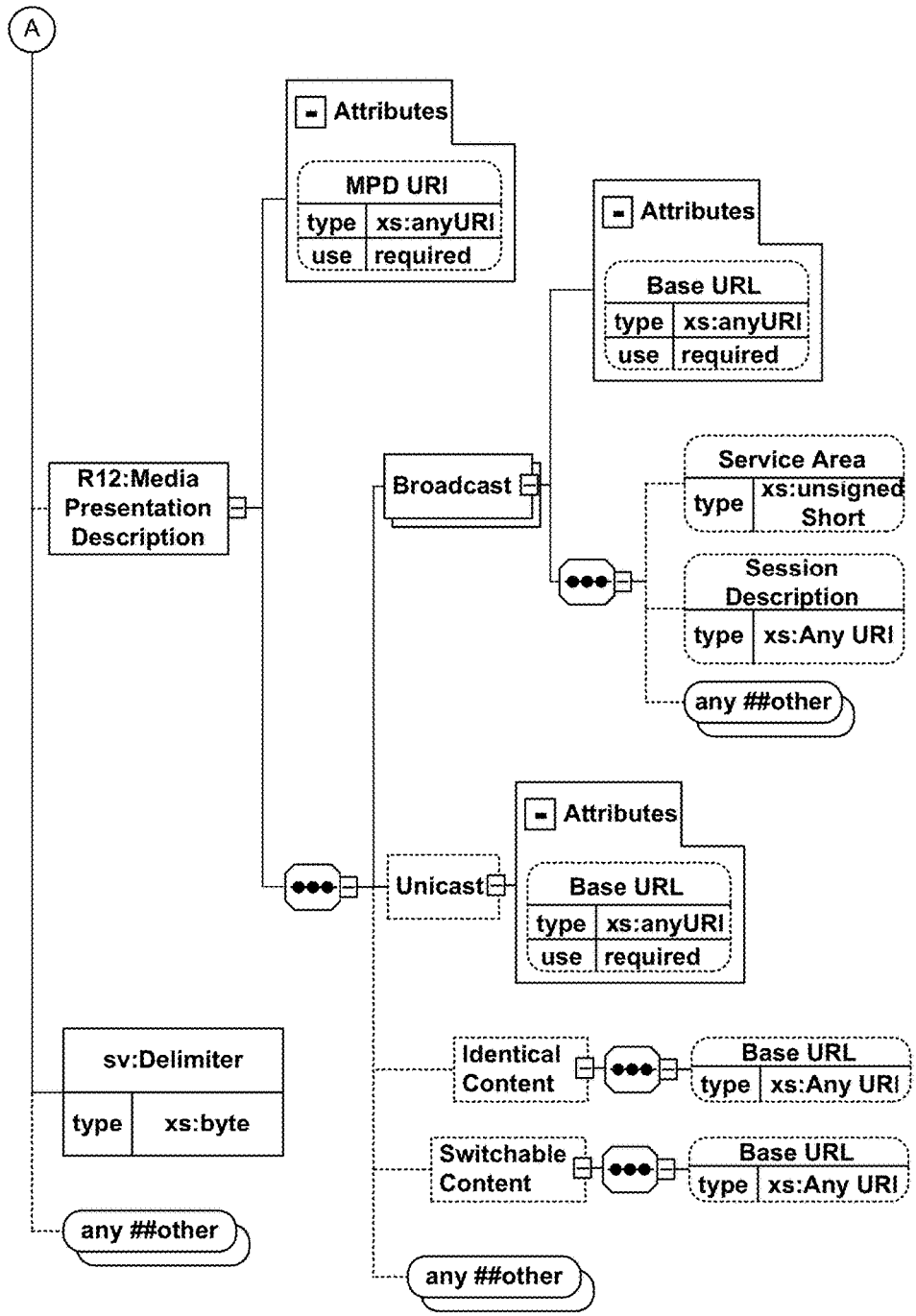

FIGS. 14A and 14B are conceptual diagrams illustrating an example XML content model for extending a USD to carry DASH Transport information. The circled A represents a point at which connections between FIGS. 14A and 14B are joined. The XML content model may be used alone or in combination with any of the techniques described above. For example, the components of FIGS. 1, 2A, 2B, 6, 7, and/or 8 may be configured to utilize the XML content model described with respect to FIGS. 14A and 14B. As discussed above, the techniques of this disclosure include techniques for selecting between unicast and broadcast transport modes. FIG. 14B illustrates data defining both a broadcast representation (broadcast element in the USD) and a unicast representation (unicast element in the USD).

In accordance with certain techniques of this disclosure, an application service client, such as a DASH client (e.g., the DASH client of FIGS. 1, 2A, 2B, 6, 7, and/or 8), may make an initial selection of a representation from which to retrieve a Segment. In particular, the DASH client may make such an initial selection while remaining agnostic of the transport mode (broadcast and/or unicast) of the Representation to which the requested Segment belongs. Assume, for purpose of example, that HTTP is used by the DASH client in requesting Segments of a selected Representation, as well as the extended USD shown in FIG. 14B is used to carry DASH Transport information. Each of the one or more broadcast Representations is identified in the USD by a unique baseURL attribute of the broadcast element.

Each instance of broadcast maps to a unique Representation delivered over the MBMS bearer. Its baseURL will be compared to a portion of the Segment URL used by the DASH client to request Segments—specifically, the initial portion of the Segment URL starting from the URI scheme and extending to and inclusive of the identifier of the Representation to which the Segment belongs, to determine whether that Representation is being requested.

For example, assume the Segment URL issued by the DASH client to be "http://example.com/per-3/rep-512/seg-99.3gp", corresponding to a request for Segment 99 of Representation 512 (Representation@id='512') in Period 3 (Period@id='3'). The portion of this URL of concern for the purpose of matching with the basesURL in the USD is "http://example.com/per-3/rep-512. In the event that this Representation is also available over broadcast, an instance of mediaPresentationDescription2.broadcast will be present in the USD with baseURL given by "http://example.com/per-3/rep-512", identical to the portion interest in the request URL. For instance, a match in the portion of interest for the request URL to the baseURL attribute of the USD's broadcast element denotes broadcast transport of the Representation to which the requested Segment belongs.

Similarly, each of the zero or more unicast Representations, in this example, is identified in the USD by a unique baseURL attribute of the mediaPresentationDescription2.unicast element. A matching pattern in the same portion of the request URL as discussed above to the unicast baseURL implies that this Representation is available over unicast delivery. The same Representation may be available over both, one-only, or neither of the transport modes.

The entity to which the DASH client submits the Segment request may be a proxy unit (or to an MBMS or eMBMS client). For purposes of example, the proxy unit is described below as performing these techniques, but it should be understood that the MBMS or eMBMS of, e.g., FIGS. 1, 2A, 2B, 6, 7, and/or 8 may be configured to perform the techniques attributed to the proxy unit, as described below. By using pattern matching between the portion of interest for the request URL to the value of baseURL in the broadcast and unicast elements in the USD, the proxy unit may determine whether the selected transport mode is available and/or preferable to another transport mode.

The proxy unit may retrieve a policy that indicates preferences among types of transports. For example, the policy may indicate that if the request is for a Representation delivered over unicast, as long as the device is located in a broadcast coverage area, only a broadcast-delivered Representation should be accessible to the DASH client. Such a broadcast Representation may be the same Representation as original requested, if the baseURL appears in the USD's identicalContent element, and can be substituted for the requested Representation, albeit delivered over a different transport mode.

Alternatively, the broadcast Representation may be an alternative Representation known to be delivered over broadcast, and is considered a switchable Representation, since the baseURL for the alternative Representation appears in the list of entries of the USD element switchableContent. In this case, the proxy unit may send a message back to the DASH client to cause the DASH client to request the same Segment belonging to an alternative Representation which is delivered over broadcast. For instance, the proxy unit may send a 300-type HTTP response message to the DASH client, which corresponds to a redirect message, and the redirect message may specify a resource URL corresponding to the alternative representation from the list contained in switchableContent.

As another example, if the DASH client requested a Segment known to the proxy unit to be delivered over broadcast but broadcast reception is not available (e.g., due to a client device being out of a coverage area for broadcast transport), the proxy unit may send a 300-type HTTP response message that includes a URL of a Segment corresponding to a unicast transport of the same, or a different Representation if that same Representation is not available over unicast transport, but appears as an entry in switchableContent.

As another example, if the DASH client requested a Segment known to the proxy unit to be delivered over broadcast and broadcast reception is available, the proxy unit will proxy the request to the local content cache, and deliver the retrieved Segment back to the DASH client.

Alternatively, the proxy unit may respond with a 400-type error message, which may cause the DASH client to re-submit a request using a different Segment URL. The proxy unit may communicate a different transport protocol in other ways as well, e.g., via an application programming interface (API), inter-process communication (IPC), sending a modified MPD that omits the selected base URL, or the like.

The redirect or error message from the proxy unit may cause the DASH client to select a different transport mode. In some examples, more than one Representation may be available on the redirected transport mode, in which case the DASH client may select from among one of those available Representations. As an example, if the DASH client had attempted to select a broadcast Representation (as given by an instance of the broadcast element of FIGS. 14A and 14B), but the proxy unit determined that broadcast reception is not available, the proxy unit may send a message (e.g., a 300-type redirect message, a 400-type error message, an API call, via IPC communications, or the like) to the DASH client to cause the DASH client to instead select the unicast Representation of FIGS. 14A and 14B.

In some instances, an application service client, such as the DASH client, may be tasked with managing unicast-broadcast transitions. This disclosure describes, with respect to FIGS. 14A and 14B as one example, a framework for extending the USD with additional parameters that may, in the case of DASH over MBMS download delivery, enable an MBMS client to determine whether Segment requests from a DASH client can be served as-is, or only from one or more alternative Representations. The USD may indicate the transport mode (broadcast-only, unicast-only, or both broadcast and unicast) of each Representation specified in the Media Presentation Description (MPD). Example scenarios for rules and mechanisms for determining Representation availability are described below.

In one example, user equipment (UE) may be located within an MBMS coverage area, and the DASH client may request a particular Representation that the USD indicates is unavailable via broadcast delivery. Service provider policy may dictate that whenever the UE is in MBMS coverage, only broadcast-delivered Representations of the same program can be accessed. In this situation, the DASH client may be limited to selecting (or redirected or instructed to select) from among the alternative Representation(s) available over broadcast delivery.

In another example, UE may be located within MBMS coverage, and the DASH client may request a Representation that is known to be available over broadcast delivery. In this situation, the desired Representation can be directly accessed by the UE.

In another example, UE may be outside MBMS reception area, and the DASH client may request a Representation that is known to be only available over broadcast delivery. In this situation, the DASH client may be limited to selecting (or redirected or instructed to select) from among the alternative Representation(s) available over unicast delivery, in the form of switchable content(s).

In another example, UE may be outside MBMS reception area, and the DASH client may request a Representation that is known to be also available over broadcast delivery. In this situation, the DASH client may be able to receive the same Representation over unicast, in the form of identical content.

Additional information that may be carried in the USD includes the indication of the service area(s) over which each Representation is delivered, and/or the identification of the SDP that describes the FLUTE session carrying that Representation.

This disclosure describes techniques by which a mediaPresentationDescription2 child element may be added under userServiceDescription to carry additional transport parameters. Previously, it was proposed that MPD-specific parameters, such as Period ID, Adaptation Set ID, and Representatation ID be contained in mediaPresentationDescription2, which may identify those Representations available over unicast delivery. These same parameters, along with URI reference to a Session Description fragment, may identify each Representation that can be delivered over broadcast, as well as the mapping to the FLUTE session carrying the Segments of that Representation.

One issue that the techniques of this disclosure may overcome is with regards to enabling the use of HTTP/1.1 as the protocol interface between the DASH client and the MBMS client for Segment request/response, while maintaining clean layering separation in protocol processing. For instance, in previous techniques, the MBMS client has to process MPD-specific information to be able to correlate the DASH client request for Segments of a particular Representation to an actually available and permitted (e.g. in accordance to service provider policy) Representation Segments by transport mode (broadcast or unicast). In the event that a requested Representation cannot be provided, in order for the MBMS client to use HTTP Redirection (via 3xx response codes as defined in Fielding et al., "Hypertext Transfer Protocol-HTTP/1.1," Network Working Group, RFC 2616, June 1999 available at http://www.ietf.org/rfc/rfc2616.txt) to inform the DASH client of one or more alternative Representations, the MBMS client will have to compose a complete Segment URI for each alternative resource. Such a layering violation on the part of the MBMS client can be eliminated through the use of the techniques of this disclosure.

The techniques of this disclosure eliminate the need for the MBMS client (or proxy unit) to be aware of or have to process (DASH-specific) MPD information. The MBMS client merely performs data/pattern matching, based on the presence of new metadata in the USD, with the Segment request URIs generated by the DASH client, in determining whether the requested Segment is available over broadcast, unicast, neither or both transport modes, or by some other fashion (e.g., cache). This is possible because the portion of the request URI that uniquely identifies the Representation to which the requested Segment belongs is also conveyed in the USD. In addition, the MBMS client can determine whether the Representation requested by the DASH client (which is agnostic to the transport mode) is available over broadcast, unicast, neither or both transport modes, or by some other fashion (e.g., cache), by the location of the matching data pattern in the USD. In conjunction with any other relevant rules and conditions, such as coverage condition (whether the UE is in unicast and/or broadcast service area), service provider policy, etc., and assuming that the substitution method for returning the alternative resource URI is allowed based on the USD attribute replacementAllowed='true'. The MBMS client can use HTTP/1.1 mechanisms to mediate Segment requests to the appropriate resource—e.g., a local content cache in the UE, or an external HTTP server, without a protocol layering violation.

As can be seen in the examples of FIGS. 14A and 14B, each of the one or more broadcast Representations is identified in the USD by a unique baseURL attribute of the broadcast element. The baseURL value may be identical to a portion of the Segment URI used by the DASH client to request a Segment of that Representation—specifically, the initial portion of the Segment URI starting from the method and extending to and inclusive of the RepresentationID. For example, if the Segment URI is the URL "http://example.com/per-3/rep-512/seg-99.3gp," corresponding to a request for Segment 99 of Representation 512 (RepresentationID=512) in Period 3, the baseURL may be defined as "http://example.com/per-3/rep-512".

In this example, each of the one or more broadcast Representations is identified in the USD by a unique baseURL attribute of the broadcast element. Each instance of broadcast maps to a unique Representation delivered over the MBMS bearer. Its baseURL will be compared to a portion of the Segment URI used by the DASH client to request Segments—specifically, the initial portion of the Segment URI starting from the URI scheme and extending to and inclusive of the Representation-ID (value of Representation@id in the MPD). For example, assume the Segment URI issued by the DASH client is the URL "http://example.com/per-3/rep-512/seg-99.3gp", corresponding to a request for Segment 99 of Representation 512 (Representation@id='512') in Period 3 (Period@id='3'). The portion of this URL of concern for the purpose of matching with USD data is "http://example.com/per-3/rep-512. In the event that this Representation is also available over broadcast, an instance of mediaPresentationDescription2.broadcast will be present in the USD with baseURL given by "http://example.com/per-3/rep-512", identical to the portion interest in the request URI.

In the event the MBMS client determines that only alternative Representation(s) to what is requested by the DASH client can be accessed, the replacementAllowed attribute of mediaPresentationDescription2 may indicate to the MBMS client whether and how to provide such notification to the DASH client via the HTTP Redirect (3xx status code) method, e.g., as defined in RFC 2616.

For instance, if replacementAllowed='true', it may be assumed that the DASH content and MPD are authored in such a way that allows the MBMS client to provide, to the DASH client, alternative resource URI(s) via '303 See Other' redirection, regardless of the transport mode of the alternative Representation. Specifically, each alternative URI may be formed by replacing the portion of interest in the Segment URI as described above with the baseURL in the USD corresponding to the alternative Representation, while retaining the Segment number in the original request.

On the other hand, if replacementAllowed='false', then such replacement method for generating an alternative resource URI and providing that to the DASH client may not be allowed. The resulting technique for causing an alternative Representation to be requested and delivered may be implementation dependent (e.g., the MBMS client may return a 4xx error code accompanied with the alternative Representation signaled by the baseURL value, and rely on the DASH client to formulate an alternative request). An example call-flow showing interactions between the MBMS client and the DASH client, based on HTTP '303' redirection, is described below with respect to FIGS. 15 and 16.

Similarly, each of the zero or more unicast Representations may be identified in the USD by a unique baseURL attribute of the mediaPresentationDescription2.unicast element. A matching pattern in the same portion of the request URI, as discussed above, to the unicast baseURL implies that this Representation is available over unicast delivery. Note that the same Representation may be available over both, one-only, or neither of the transport modes.

Otherwise, via the sessionDescription element, each broadcast Representation may be linked to a Session Description fragment or SDP document pertaining to the FLUTE session carrying that Representation. In addition, the serviceArea element, if present, may denote the MBMS service area(s) over which the broadcast Representation(s) are available.

Figure 15:
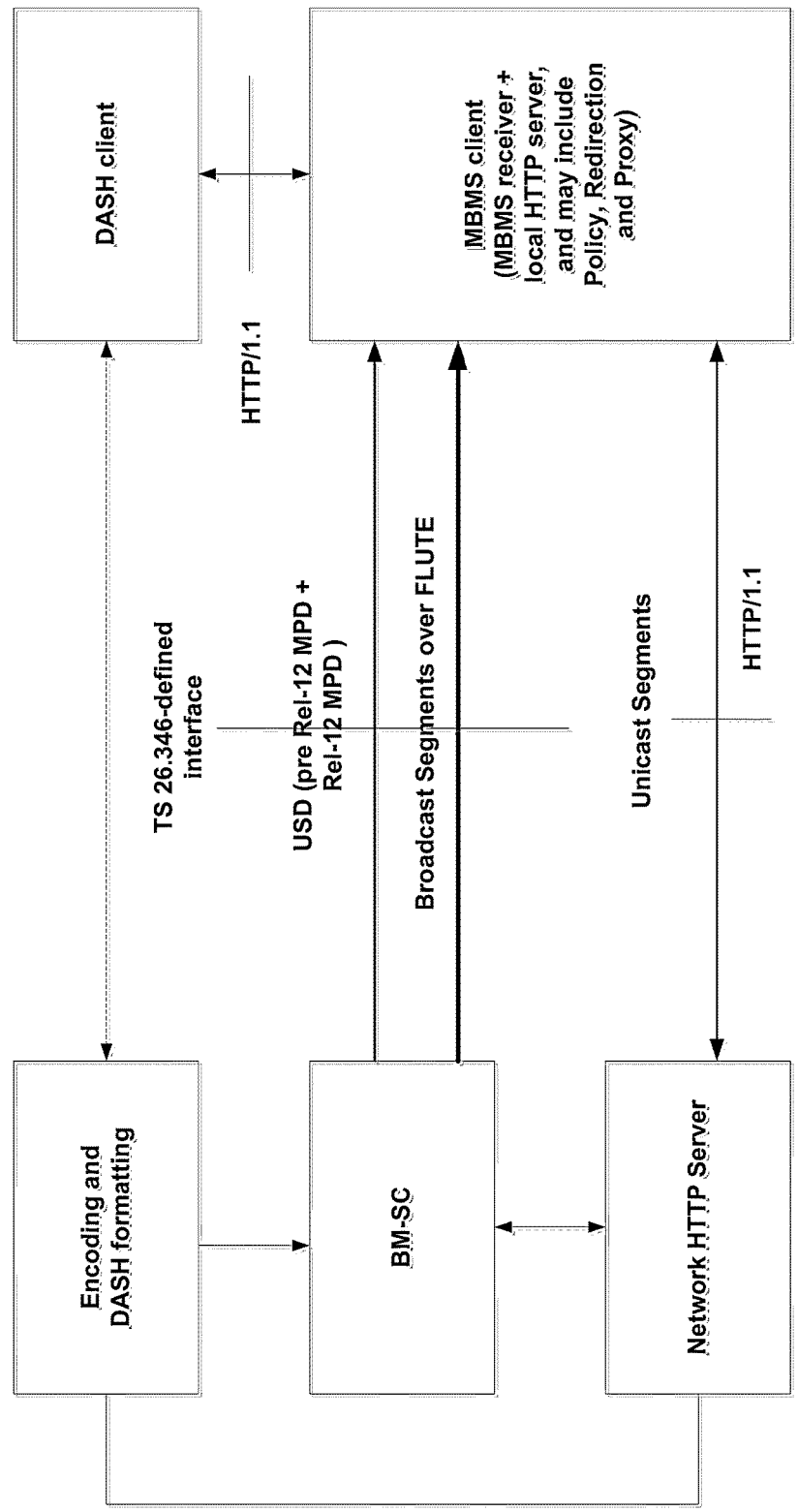
FIG. 15 is a conceptual diagram illustrating an example architecture for supporting DASH over MBMS.

FIG. 15 is a conceptual diagram illustrating an architecture for supporting DASH over an MBMS. The example of FIG. 15 represents an end-to-end network architecture for DASH content delivery over MBMS bearer with unicast fallback. FLUTE-based download delivery represents the TS 26.346-defined interface between the BM-SC and MBMS client. The assumed interface between the DASH client and the MBMS client (here assumed to be a composite entity including MBMS receiver, device-based HTTP server, policy, redirection and proxy functions) is HTTP/1.1.

Figure 16:
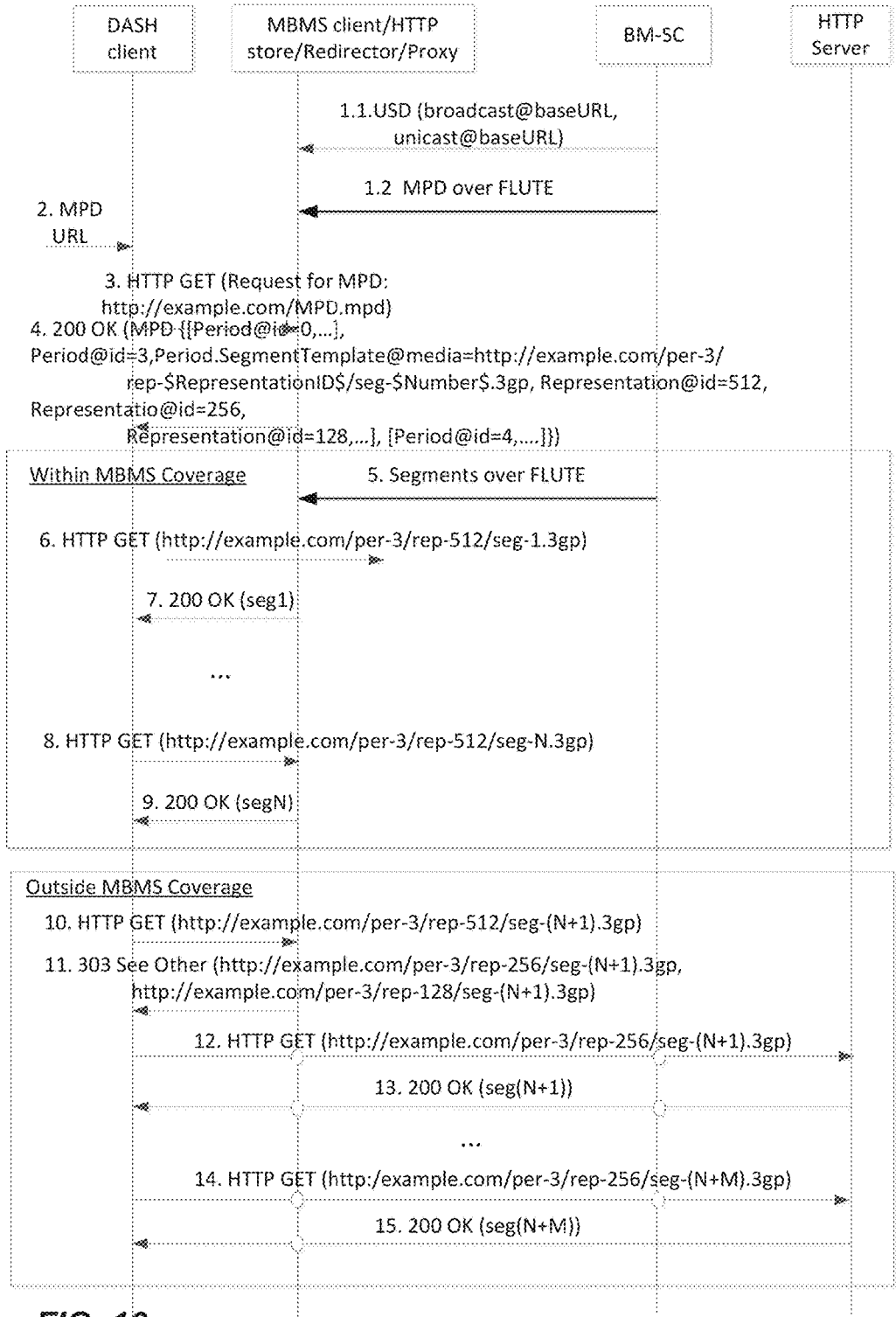
FIG. 16 is a flow diagram illustrating a call-flow associated with the network architecture of FIG. 15 for DASH content delivery over broadcast and unicast transport.

FIG. 16 is a flow diagram illustrating a call-flow associated with the network architecture of FIG. 15 for DASH content delivery over broadcast and unicast transport. The techniques described with respect to FIG. 16 are based on the USD extension shown in FIGS. 14A and 14B for carrying DASH transport information. Although described as corresponding to the network architecture of FIG. 15, it should be understood that the techniques of FIG. 16 may be performed by other devices, e.g., the devices in the architectures of FIGS. 1, 2A, 2B, 6, 7, 8, and/or 17. In the example of FIG. 16, it is assumed that the USD contains the information shown in Table 3, which includes values of the baseURL attribute under mediaPresentationDescription2.broadcast and mediaPresentationDescription2.unicast, and it is assumed that the value of the replacementAllowed attribute in the USD is "true."

TABLE 3

| mediaPresentationDescription2.broadcast (base URL) | mediaPresentationDescription2.unicast (base URL) |
| --- | --- |
| http://example.com/per-3/rep-512 | http://example.com/per-3/rep-256<br>http://example.com/per-3/rep-128 |

Furthermore, in this example, it is assumed that the MPD includes the following contents:
MPD@type='dynamic'
Period@id='3'
Period.SegmentTemplate@media='http://example.com/per-3/rep-$RepresentationID$/seg-$Number$.3gp'
Representation@id='512' . . .
Representation@id='256' . . .
Representation@id='128' . . .

Given these example MPD parameter values, the DASH client attempting to request Segment no. 99 for Representation 512 in Period 3 may issue the following request URI: http://example.com/per-3/rep-512/seg-99.3gp. The call flow of FIG. 16 describes DASH content delivery for two different situations: 1) UE is located in MBMS coverage, and requests Segments of Representation 512 of Period 3, which is available over broadcast delivery, and subsequently, 2) UE moves outside MBMS coverage, and continues to request the same Representation (i.e., Representation 512), which is not available over unicast delivery, but Representations 256 and 128 are available over unicast.

In other words, this disclosure describes certain techniques for the use of USD-based signaling of DASH transport in support of transport diversity. It may provide one or more improvements over a previous proposal described in Tdoc S4-130051, "Rationale for USD Indication of DASH Delivery Mode and Illustrative Implementation" from Qualcomm Inc. For instance, a layering violation may be entirely avoided in this method, because the MBMS client does not have to understand or process MPD information. Instead, the MBMS client may perform data pattern matching of known transport semantics against the URIs of Segments requested by the DASH client to determine whether the requested Segments are requested to be delivered via broadcast and/or unicast, and whether that request can be satisfied as is, or needs to be redirected to the same or an alternate Representation available using another transport mode.

Such determination may be based on factors such as whether UE is located inside or outside of MBMS coverage, service provider policy, if any, governing accessibility of Representations by transport mode, and possibly dependent on other conditions or rules. Example network architecture and call flow diagram for DASH content delivery via MBMS with unicast fallback were provided to illustrate end-to-end content delivery featuring the use of HTTP protocol interface between the DASH client and MBMS client. The adherence to protocol layering should provide architectural benefits in extensibility and simplicity of UE implementation in support of DASH-in-MBMS services.

The use of HTTP Redirect via the 3xx status code by the MBMS client to restrict the DASH client access to an alternative resource (Representation) is predicated on the mediaPresentationDescription2's replacementAllowed attribute having the value 'true'. In such event, it is assumed that the DASH content and MPD are authored in such a way that allows the MBMS client to provide to the DASH client alternative resource URI(s) via '303 See Other' redirection, regardless of the transport mode of the alternative Representation. Specifically, each alternative URI is formed by replacing the portion of interest in the Segment URL as described above with the baseURL in the USD corresponding to the alternative Representation, while retaining the Segment number in the original request. If the value of replacementAllowed='false', then such replacement method for generating an alternative resource URI and providing that to the DASH client is not allowed.

The resulting techniques to cause an alternative Representation to be requested and delivered may be implementation dependent. For example, the MBMS client may return an 4xx error code accompanied with or without an alternative Representation as signaled by the baseURL value in the entity body of the HTTP response, and rely on the DASH client to form an alternative request. Here, the presence of the baseURL identifying an alternative Representation is available in the response may be used as a hint to the DASH client with the intelligence to directly request that Representation as follow-up. Alternatively, the baseURL "hint" may not be provided in the 4xx response, or the DASH client may lack the intelligence to utilize such hint in generating a new request for another Representation which may or may not correspond to the allowed Representation from the MBMS client perspective.

Figure 17:
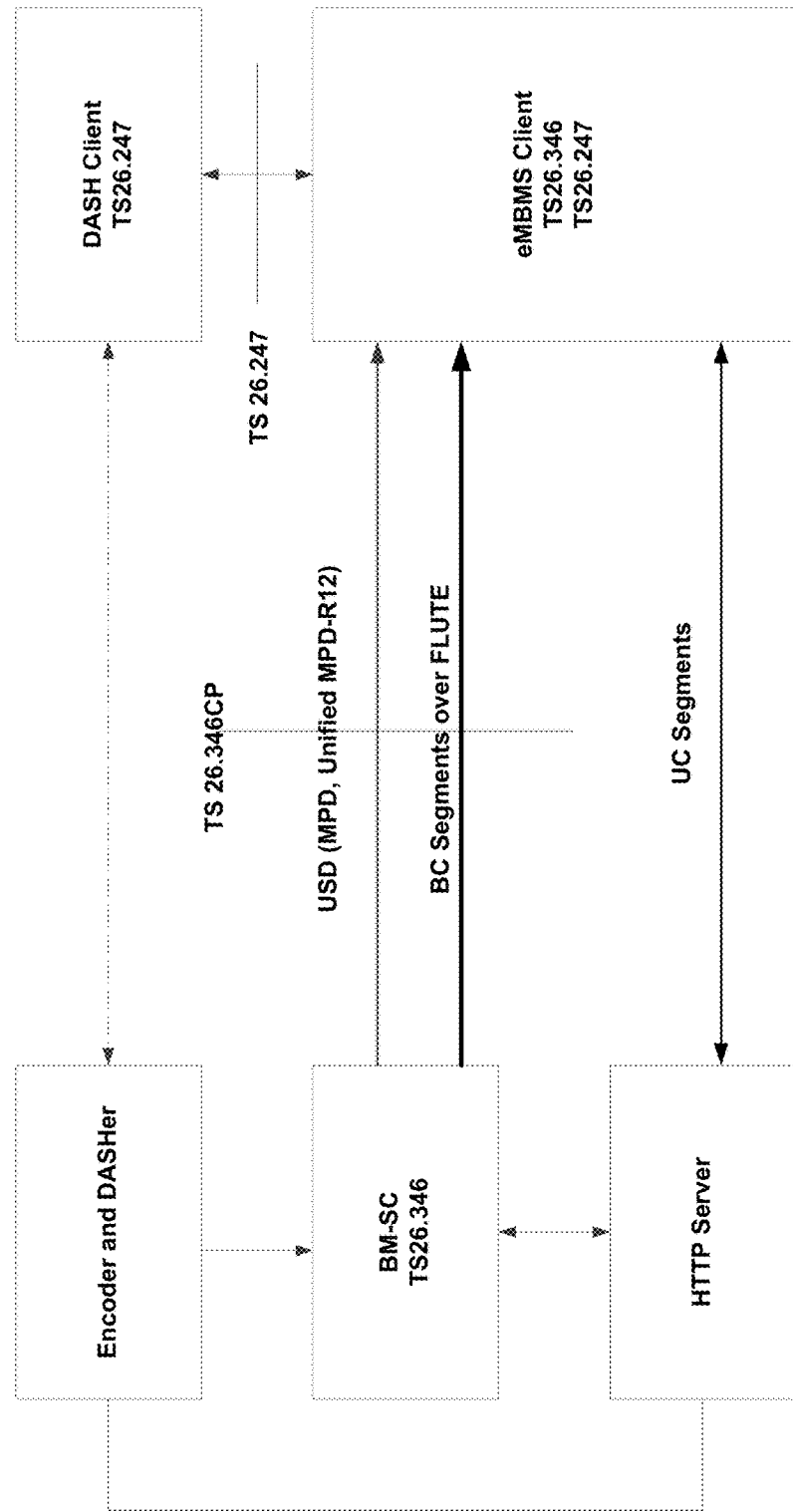
FIG. 17 is a conceptual diagram illustrating another example architecture for supporting DASH over MBMS.

FIG. 17 is a conceptual diagram illustrating another example architecture for supporting DASH over MBMS. It may be important to specify the interface between BM-SC and eMBMS Client and the interface between eMBMS Client and DASH Client in an appropriate standard. For example, the standard may specify that the interface between BM-SC and eMBMS Client shall comply with TS 26.346. The standard may also specify that the interface between eMBMS Client and DASH Client should follow TS 26.247 if DASH client and eMBMS client are from different vendors. Contrasted with the example of FIG. 16, FIG. 17 illustrates an example in which an interface between a DASH client and an eMBMS client may conform to TS 26.247 (which may be, for example, HTTP/1.1). FIG. 17 illustrates a high level architecture to allow DASH over MBMS to be fall back to DASH over unicast.

FIGS. 18-23 are flow diagrams illustrating various example call-flows associated with the network architecture of FIG. 17 for DASH content delivery over broadcast and unicast transport. Although described as corresponding to the network architecture of FIG. 17, it should be understood that the techniques of FIGS. 18-23 may be performed by other devices, e.g., the devices in the architectures of FIGS. 1, 2A, 2B, 6, 7, 8, and/or 15.

With respect to the example of FIG. 18, USD signaling may include the data shown in Table 4 below for the eMBMS Client:

TABLE 4

| Broadcast@BaseURL | Unicast@BaseURL |
|---|---|
| http://www.cnn.com/512/seg$Number$.3pg | http://www.cnn.com/256/seg$Number$.3pg |
| | http://www.cnn.com/128/seg$Number$.3pg |

The MPD in this example may specify the following data, where BaseURLs correspond to base portions of URLs for accessing Segments:
BaseURL1=http://www.cnn.com/512/, RepresentationId="512";
Template=seg$Number$.3gp,
BaseURL2=http://www.cnn.com/256/, RepresentationId="256";
Template=seg$Number$.3gp,
BaseURL3=http://www.cnn.com/128/, RepresentationId="128";
Template=seg$Number$.3gp.

Figure 18:
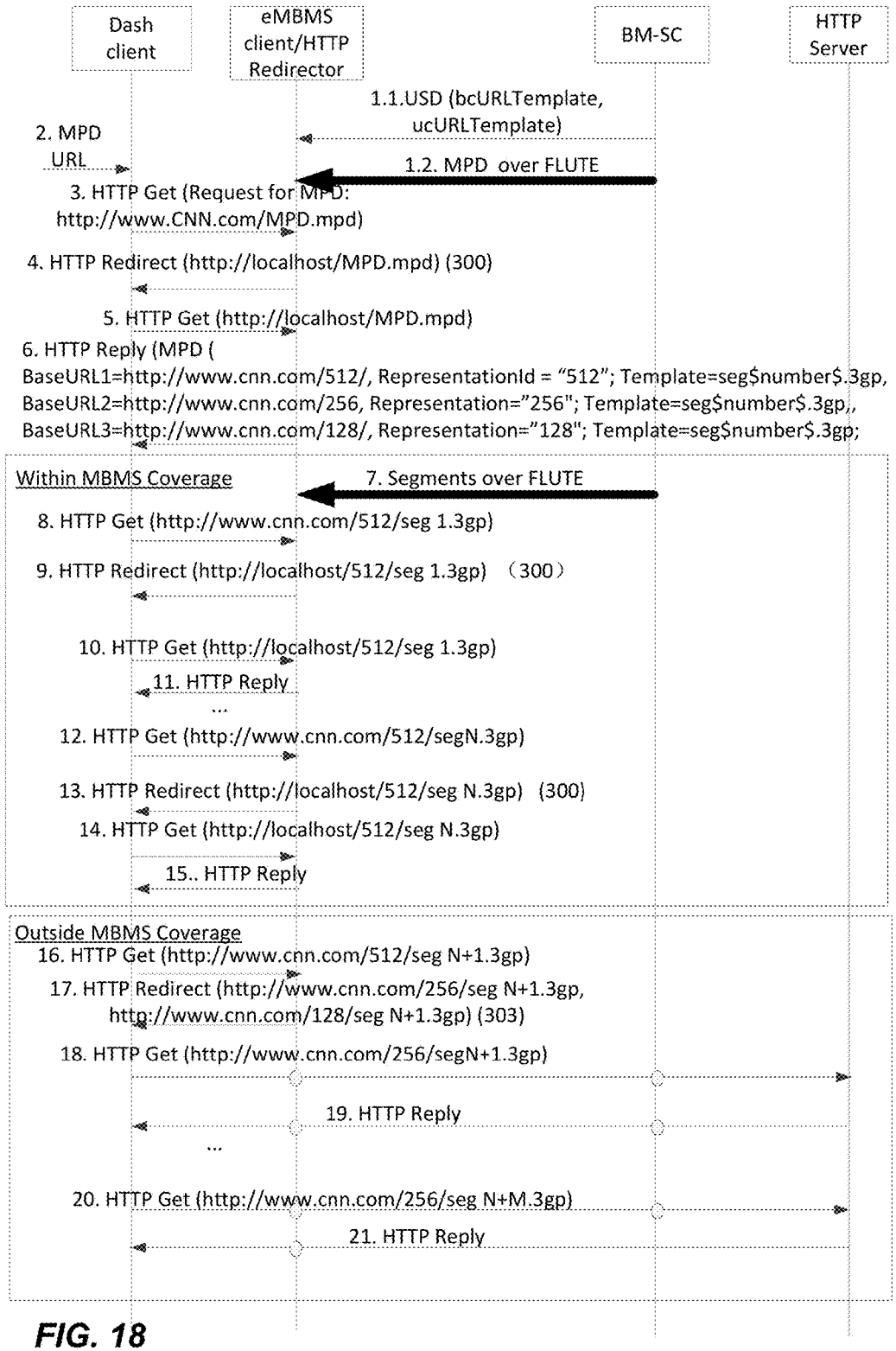
FIGS. 18-23 are flow diagrams illustrating various example call-flows associated with the network architecture of FIG. 17 for DASH content delivery over broadcast and unicast transport.

In the example of FIG. 18, it is assumed that the eMBMS client does not have HTTP Proxy functions, but only has HTTP redirector functions.

With respect to the example of FIG. 19, USD signaling may include the data shown in Table 5 below for the eMBMS Client:

TABLE 5

| Broadcast@BaseURL | Unicast@BaseURL |
|---|---|
| http://www.cnn.com/512/seg$Number$.3pg | http://www.cnn.com/256/seg$Number$.3pg |
| | http://www.cnn.com/128/seg$Number$.3pg |

The MPD in this example may specify the following data, where BaseURLs correspond to base portions of URLs for accessing Segments:
BaseURL1=http://www.cnn.com/512/, RepresentationId="512";
Template=seg$Number$.3gp,
BaseURL2=http://www.cnn.com/256/, RepresentationId="256";
Template=seg$Number$.3gp,
BaseURL3=http://www.cnn.com/128/, RepresentationId="128";
Template=seg$Number$.3gp.

Figure 19:
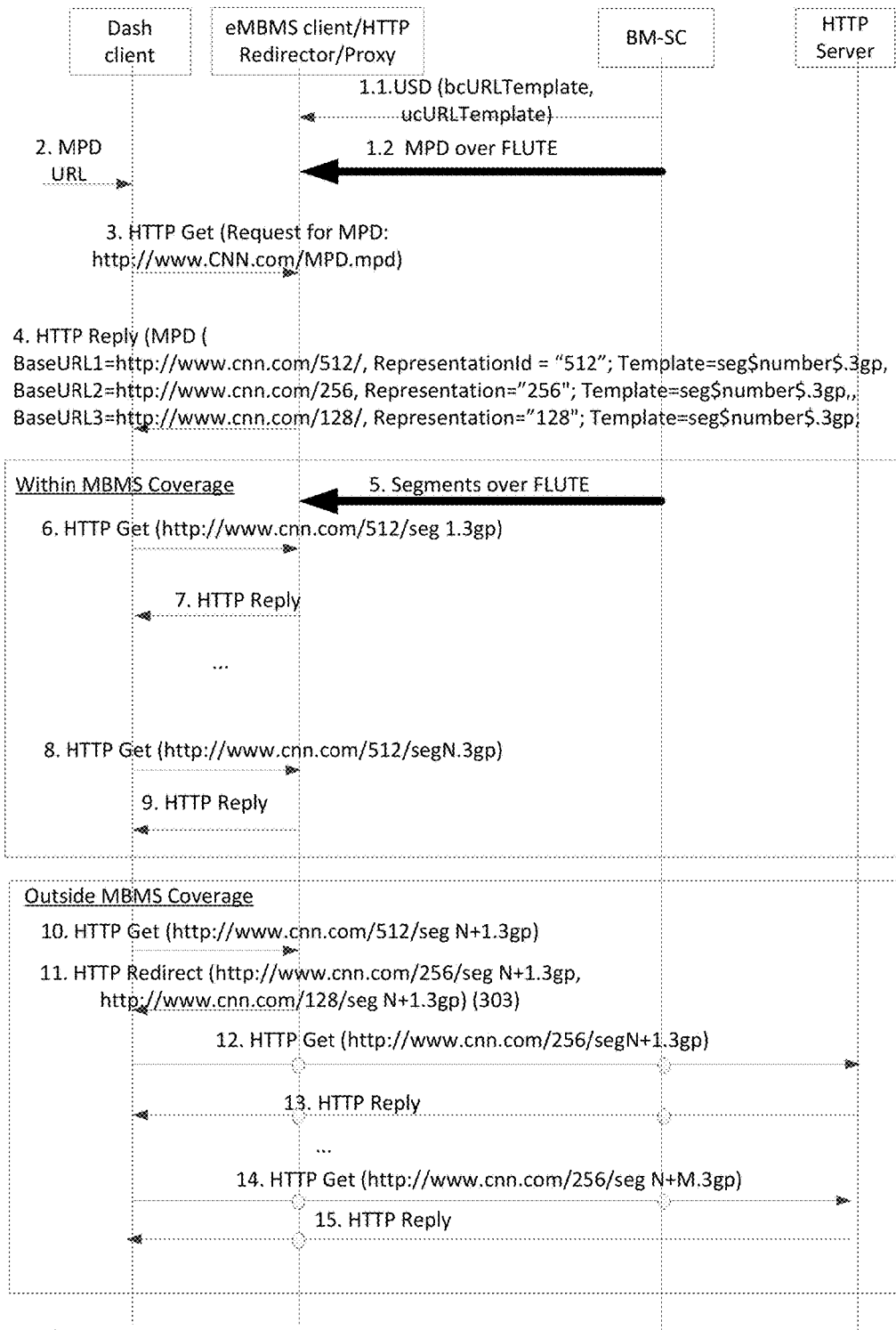

In the example of FIG. 19, it is assumed that eMBMS client has both HTTP Proxy and HTTP Redirector function.

With respect to the example of FIG. 20, USD signaling may include the data shown in Table 6 below for the eMBMS Client:

TABLE 6

| Broadcast@BaseURL | Unicast@BaseURL |
|---|---|
| http://www.cnn.com/512/seg$Number$.3pg | http://www.cnn.com/512/seg$Number$.3pg<br>http://www.cnn.com/256/seg$Number$.3pg<br>http://www.cnn.com/128/seg$Number$.3pg |

The MPD in this example may specify the following data, where BaseURLs correspond to base portions of URLs for accessing Segments:
BaseURL1.1=http://www.cnn.com/512/,
BaseURL1.2=http://localhost/512/, RepresentationId="512";
Template=seg$Number$.3gp,
BaseURL2=http://www.cnn.com/256/, RepresentationId="256";
Template=seg$Number$.3gp,
BaseURL3=http://www.cnn.com/128/, RepresentationId="128";
Template=seg$Number$.3gp.

Figure 20:
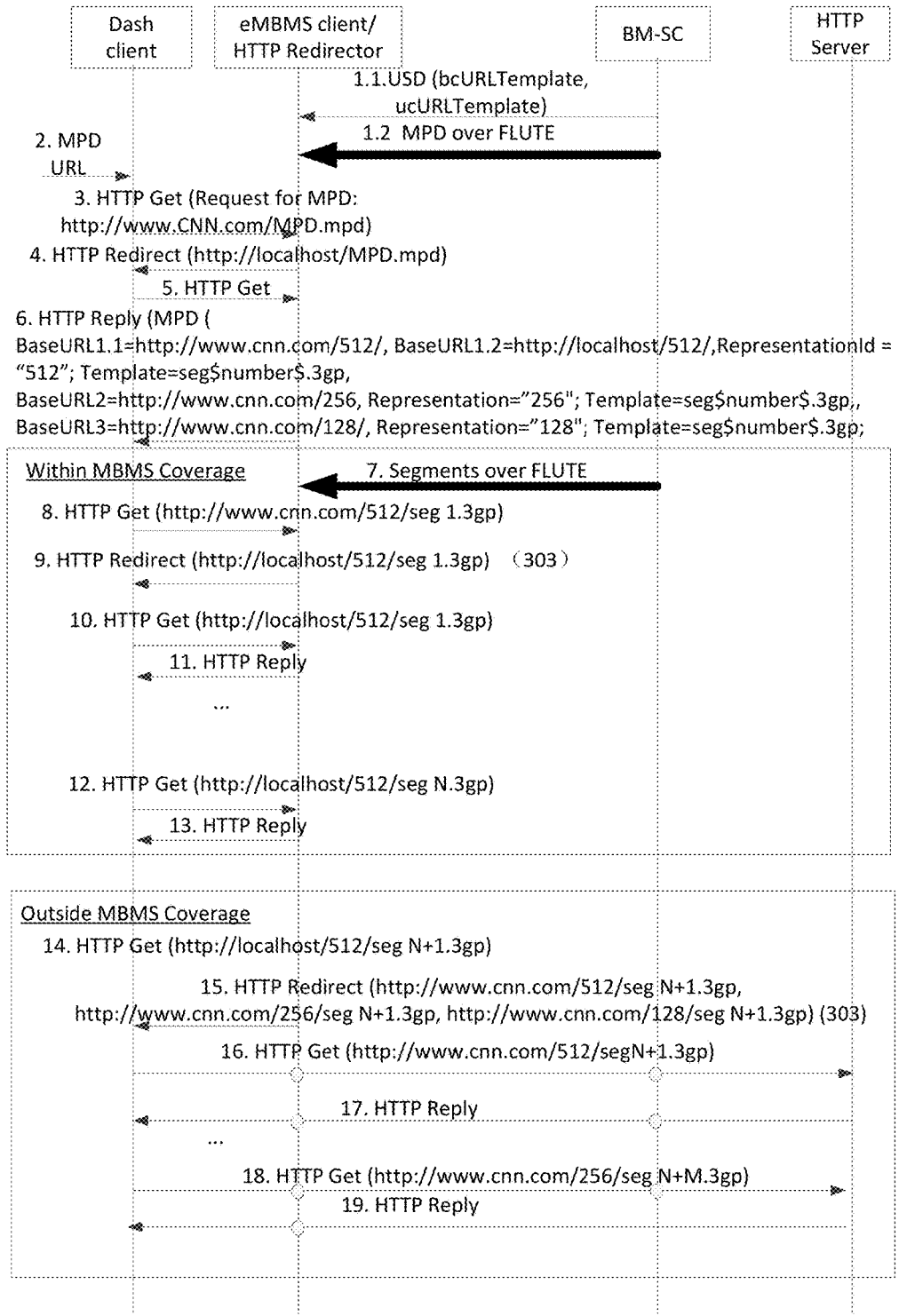

In the example of FIG. 20, it is assumed that the eMBMS client does not have HTTP Proxy function, but only has HTTP Redirector function.

With respect to the example of FIG. 21, USD signaling may include the data shown in Table 7 below for the eMBMS Client:

TABLE 7

| Broadcast@BaseURL | Unicast@BaseURL |
|---|---|
| http://www.cnn.com/512/seg$Number$.3pg | http://www.cnn.com/512/seg$Number$.3pg<br>http://www.cnn.com/256/seg$Number$.3pg<br>http://www.cnn.com/128/seg$Number$.3pg |

The MPD in this example may specify the following data, where BaseURLs correspond to base portions of URLs for accessing Segments:
BaseURL1=http://www.cnn.com/;
RepresentationId="512"; Template=$RepresentationId$/seg$Number$.3 gp,
RepresentationId="256"; Template=$Representagtion$/seg$Number$.3gp,
RepresentationId="128"; Template=$Representagtion$/seg$Number$.3gp.

Figure 21:
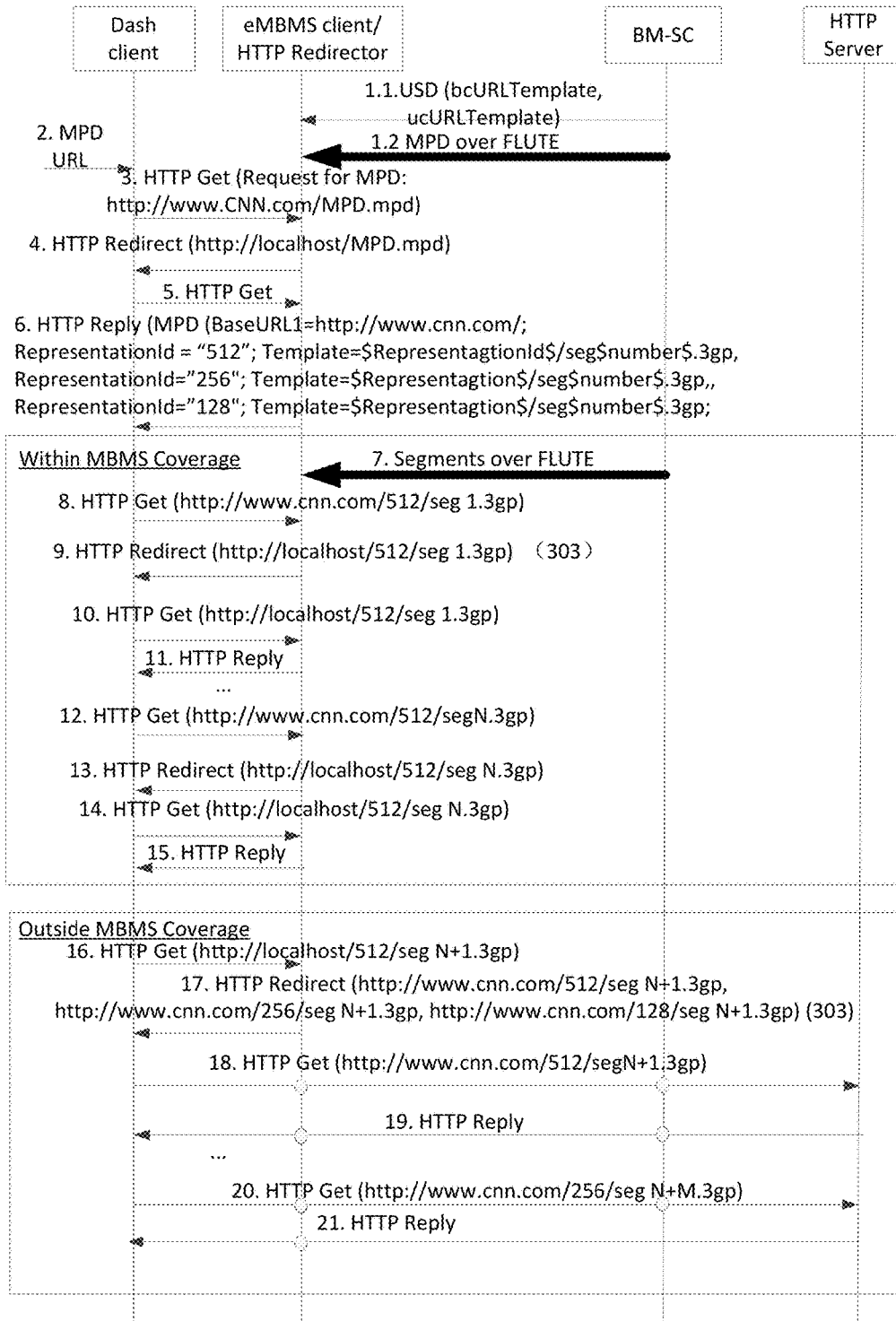

In the example of FIG. 21, it is assumed that eMBMS client does not have HTTP Proxy function, but only has HTTP Redirector function.

With respect to the example of FIG. 22, USD signaling may include the data shown in Table 8 below for the eMBMS Client:

TABLE 8

| Broadcast@BaseURL | Unicast@BaseURL |
|---|---|
| http://localhost/512/seg$Number$.3pg | http://www.cnn.com/256/seg$Number$.3pg<br>http://www.cnn.com/128/seg$Number$.3pg |

The MPD in this example may specify the following data, where BaseURLs correspond to base portions of URLs for accessing Segments:

BaseURL1=http://localhost/512/, RepresentationId="512";
  Template=seg$Number$.3gp,
BaseURL2=http://www.cnn.com/256/, RepresentationId="256";
  Template=seg$Number$.3gp,
BaseURL3=http://www.cnn.com/128/, RepresentationId="128";
  Template=seg$Number$.3gp.

Figure 22:
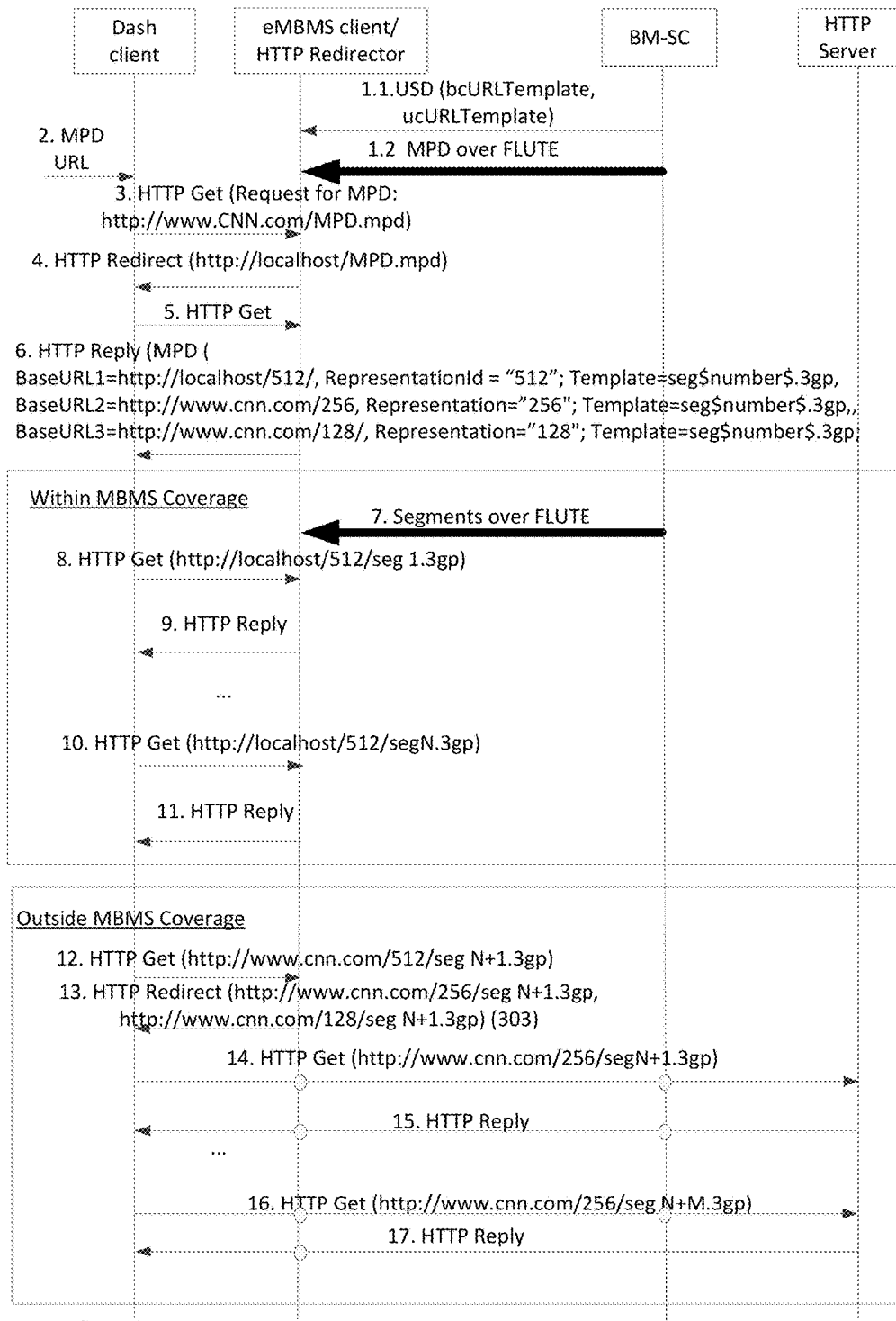

In the example of FIG. 22, it is assumed that eMBMS client does not have HTTP Proxy function, but only has HTTP Redirector function.

With respect to the example of FIG. 23, USD signaling may include the data shown in Table 9 below for the eMBMS Client:

TABLE 9

| Broadcast@BaseURL | Unicast@BaseURL |
|---|---|
| http://www.cnn.com/1024/seg$Number$.3pg | http://www.cnn.com/256/seg$Number$.3pg |
| http://www.cnn.com/512/seg$Number$.3pg | http://www.cnn.com/128/seg$Number$.3pg |

The MPD in this example may specify the following data, where BaseURLs correspond to base portions of URLs for accessing Segments:

BaseURL1=http://www.cnn.com/1024/, RepresentationId="1024";
  Template=seg$Number$.3gp,
BaseURL2=http://www.cnn.com/512/, RepresentationId="512";
  Template=seg$Number$.3gp,
BaseURL3=http://www.cnn.com/256/, RepresentationId="256";
  Template=seg$Number$.3gp,
BaseURL4=http://www.cnn.com/128/, RepresentationId="128";
  Template=seg$Number$.3gp.

Figure 23:
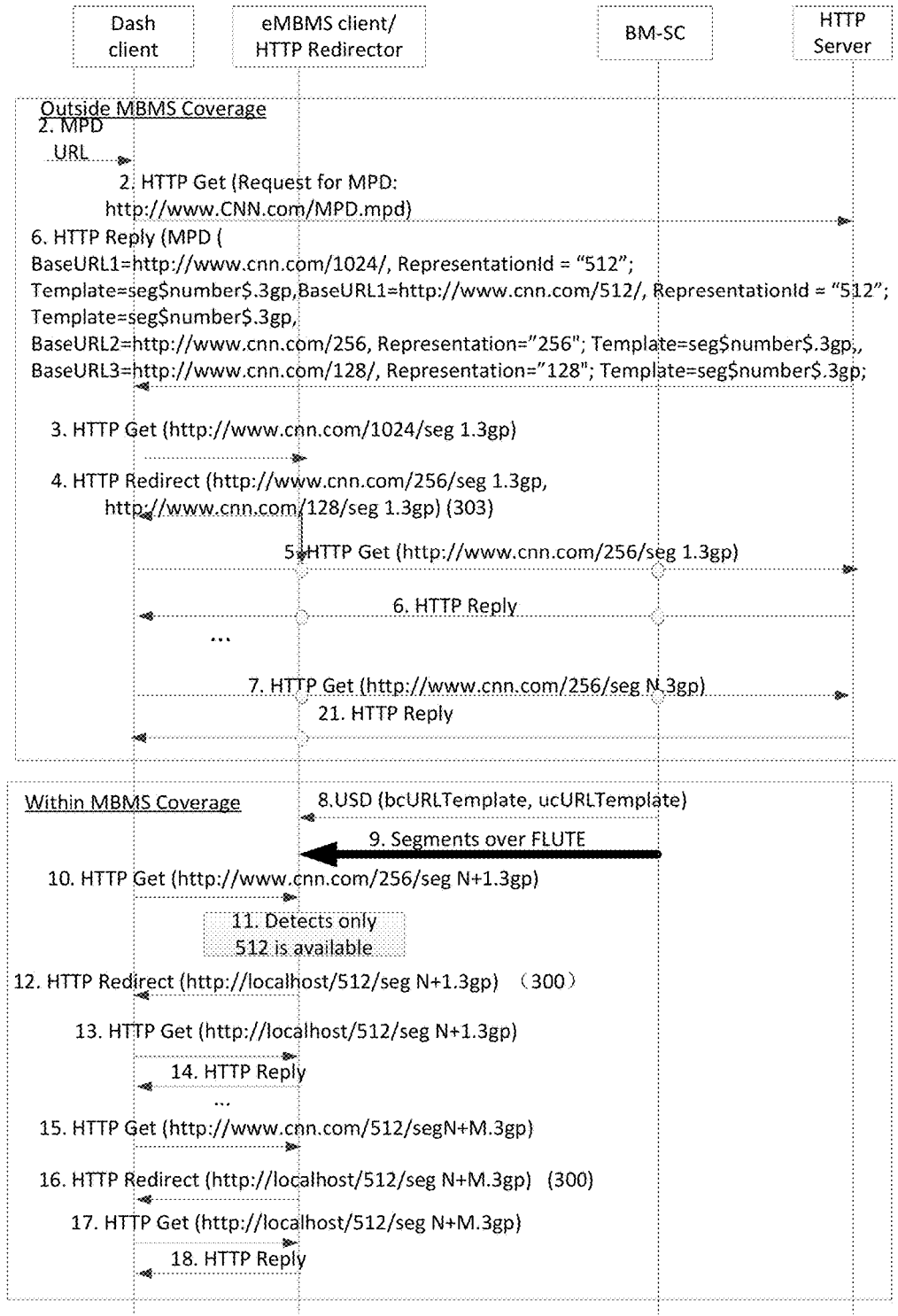

In the example of FIG. 23, it is assumed that eMBMS client does not have HTTP Proxy function, but only has HTTP Redirector function.

Figure 24:
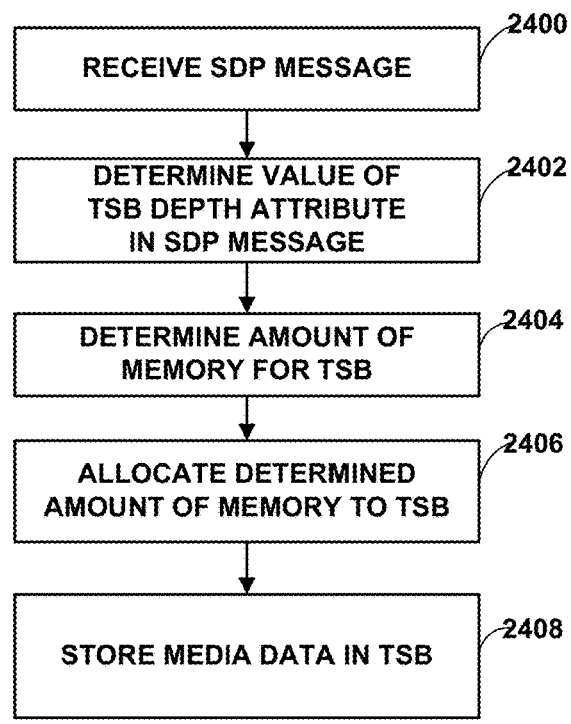
FIG. 24 is a flowchart illustrating an example method for signaling data related to a time-shifted buffer (TSB) depth in accordance with the techniques of this disclosure.

FIG. 24 is a flowchart illustrating an example method for signaling data related to a time-shifted buffer (TSB) depth in accordance with the techniques of this disclosure. For purposes of example, the method of FIG. 25 is explained with respect to the components of FIG. 10, e.g., MSDC 1010 and TSB 1212. However, it should be understood that the techniques for utilizing a time-shifted buffer may be incorporated into any of the various systems described herein, e.g., the systems of any of FIGS. 1, 7, 8, 9, 12, 13, and/or 17.

Initially, MSDC 1010 may receive a session description protocol (SDP) message (2400). The SDP message may include an attribute that defines a time-shifted buffer (TSB) depth. Accordingly, MSDC 1010 may determine a value for the attribute (also referred to as a TSB depth attribute) in the SDP message (2402). The value of the TSB depth attribute may define the depth of the TSB, e.g., in terms of seconds of playback for media data to be stored in the TSB. For example, the value of the attribute may define a maximum playback time, in seconds, that can be stored in the TSB.

MSDC 1010 may therefore determine an amount of memory to be allocated to form the TSB from the signaled depth (2404). For example, assuming that the depth of the TSB is signaled in terms of seconds of playback for media data, and assuming that a frame rate is signaled for video data, MSDC may determine a number of video frames to be stored in the TSB, as the product of the frame rate (expressed in frames per second) and the number of seconds of media data to be stored. MSDC 1010 may then determine an amount of memory for the TSB based on the product of an average bitrate per frame and the number of frames. MSDC 1010 may use similar concepts for determining memory size for audio data, timed text data, and the like.

MSDC 1010 may then allocate the determined amount of memory to form the TSB (2406). Thus, as MSDC 1010 receives media data, MSDC 1010 may store the received media data in the TSB (2408). A playback application may use this buffered media data for time-shifted application, such as for watching at a later time or for performing a trick mode, such as fast forward or rewind. Of course, the buffered data may also be used for substantially real time playback.

In this manner, the method of FIG. 24 represents an example of a method including receiving a session description protocol (SDP) message including an attribute that defines a time-shifted buffer (TSB) depth, determining an amount of memory for the TSB based on a value of the attribute, allocating the determined amount of memory to the TSB, and storing at least a portion of media data associated with the SDP message in the TSB.

Those of ordinary skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill will further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In one or more examples, the functions described may be implemented in hardware, software, firmware, or any combination thereof. If implemented in software, the functions may be stored on or transmitted as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The detailed description set forth above, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Various examples have been described. These and other examples are within the scope of the following claims.

What is claimed is:

1. A method of retrieving media data, the method comprising:

by a proxy unit of a client device:

obtaining mapping information that maps an identifier for media data to a network location of a server device having the media data, wherein the network location is accessible via a first service, provided by the server device, for retrieving the media data when the first service is available, wherein the first service defines at least one of broadcast or multicast as a type of transport for transporting the media data;

receiving an HTTP Get or partial Get request for the media data from an application service client of the client device;

in response to receiving the HTTP Get or partial Get request from the application service client:

determining that the server device has the media data using the mapping information; and after determining that the server device has the media data using the mapping information, determining whether the first service is available, comprising determining whether the client device is in a service area in which the server device provides the first service;

when the first service is available, sending instructions to the application service client of the client device configured to cause the application service client to retrieve the media data from a middleware unit of the client device that receives the media data using the first service from the network location, based on the mapping information; and when the first service is not available:

determining whether the media data specified in the request matches the media data in the mapping information, wherein the mapping information includes priority values for each potential match, and wherein determining whether the media data specified in the request matches the media data in the mapping information comprises selecting a match having one of a lowest priority value or a highest priority value; and when the media data specified in the request matches the media data in the mapping information, sending an HTTP redirect message to the application service client to cause the application service client to retrieve the media data from the selected matching network location according to a second service, wherein the second service defines unicast as a type of transport for transporting the media data, wherein the second service is different than the first service, and wherein the HTTP redirect message specifies the network location to which the identifier for the media data is mapped in the mapping information.

2. The method of claim 1, further comprising, when the media data specified in the request does not match the media data in the mapping information, sending the HTTP redirect message to the application service client specifying a default re-direction network location to cause the application service client to retrieve the media data from the default re-direction network location.

3. The method of claim 1, further comprising, when the media data specified in the request does not match the media data in the mapping information, sending an error message to the application service client.

4. The method of claim 1, further comprising, when the media data specified in the request does not match the media data in the mapping information, sending a copy of the request back to the application service client.

5. The method of claim 1,
further comprising: storing the mapping information in a mapping table,
wherein determining whether the media data specified in the request matches the media data in the mapping information comprises determining whether an identifier for the media device corresponds to an entry in the mapping table.

6. The method of claim 1,
wherein the mapping information comprises mapping criteria expressed as uniform resource identifier (URI) prefixes, and
wherein determining whether the media data specified in the request matches the media data in the mapping information comprises determining a URI prefix of the mapping information that matches at least a portion of a URI of the media data indicated in the request.

7. The method of claim 6, wherein determining a URI prefix of the mapping information that matches at least a portion of a URI of the media data indicated in the request comprises determining a longest URI prefix of the mapping information that matches at least a portion of a URI of the media data indicated in the request.

8. The method of claim 6,
wherein the URI prefixes expressed by the mapping criteria correspond to respective services defining types of transport for transporting media data, and
wherein a first URI prefix of the URI prefixes defines a broadcast service and a second URI prefix of the URI prefixes defines a unicast service.

9. The method of claim 1, wherein sending the HTTP redirect message comprises at least one of:
sending an inter-process communication (IPC) to the application service client; or
calling an application programming interface (API) of the application service client.

10. The method of claim 1,
wherein the mapping information comprises mapping criteria expressed as regular expressions, and
wherein determining whether the media data specified in the request matches the media data in the mapping information comprises selecting a regular expression that matches a largest number of characters that directly match an identifier for the media data indicated in the request.

11. The method of claim 1,
wherein the mapping information comprises mapping criteria expressed as regular expressions,
wherein the mapping information includes priority values for each potential match, and
wherein determining whether the media data specified in the request matches the media data in the mapping information comprises selecting a match having a highest priority value.

12. The method of claim 1,
wherein the mapping information comprises mapping criteria expressed as regular expressions,
wherein the mapping information includes priority values for each potential match, and
wherein determining whether the media data specified in the request matches the media data in the mapping information comprises selecting a match having a lowest priority value.

13. The method of claim 1, wherein determining whether the first service is available comprises determining whether the client device is within a service coverage area.

14. The method of claim 1, wherein the request conforms to a dynamic adaptive streaming over HTTP (DASH) request, the method further comprising:
by the proxy unit:
receiving the DASH request, wherein the DASH request specifies a network address of the proxy unit;
in response to the DASH request, retrieving the media data specified in the request, and providing the media data to the application service client.

15. A device for retrieving media data, the device comprising one or more hardware-based processors implementing a proxy unit configured to:
obtain mapping information that maps an identifier for media data to a network location of a server device having the media data, wherein the network location is accessible via a first service, provided by the server device, for retrieving the media data when the first service is available, wherein the first service defines at least one of broadcast or multicast as a type of transport for transporting the media data,
receive an HTTP Get or partial Get request for the media data from an application service client of the device,
in response to receiving the HTTP Get or partial Get request from the application service client:
determine that the server device has the media data using the mapping information, and
after determining that the server device has the media data using the mapping information, determine whether the first service is available, wherein the proxy unit is configured to determine whether the client device is in a service area in which the server device provides the first service,
when the first service is available, send instructions to the application service client configured to cause the application service client to retrieve the media data from a middleware unit of the device that receives the media data using the first service from the network location, based on the mapping information, and
when the first service is not available:
determine whether the media data specified in the request matches the media data in the mapping information, wherein the mapping information includes priority values for each potential match, and select a match having one of a lowest priority value or a highest priority value; and
when the media data specified in the request matches the media data in the mapping information, send an HTTP redirect message to the application service client to cause the application service client to retrieve the media data from the selected matching network location according to a second service, wherein the second service defines unicast as a type of transport for transporting the media data, and wherein the HTTP redirect message specifies the network location to which the identifier for the media data is mapped in the mapping information.

16. The device of claim 15, wherein the proxy unit is further configured to, when the media data specified in the request does not match the media data in the mapping information, at least one of:

send the HTTP redirect message to the application service client specifying a default re-direction location to cause the application service client to retrieve the media data from the default re-direction location;

send an error message to the application service client; and send a copy of the request back to the application service client.

17. The device of claim 15, wherein the proxy unit is further configured to store the mapping information in a mapping table, and wherein to determine whether the media data specified in the request matches the media data in the mapping information, the proxy unit is configured to determine whether an identifier for the media device corresponds to an entry in the mapping table.

18. The device of claim 15, wherein the mapping information comprises mapping criteria expressed as uniform resource identifier (URI) prefixes, and wherein to determine whether the media data specified in the request matches the media data in the mapping information, the proxy unit is configured to determine a URI prefix of the mapping information that matches at least a portion of a URI of the media data indicated in the request.

19. The device of claim 15, further comprising second one or more processors implementing a controller unit that sends, to the proxy unit, information indicating whether the first service is available.

20. The device of claim 15, further comprising second one or more processors implementing the middleware unit that receives the media data, wherein the middleware unit comprises one of a multimedia broadcast multicast services (MBMS) middleware unit and an evolved MBMS (eMBMS) middleware unit.

21. The device of claim 15, wherein the device comprises a client device, and wherein the client device comprises the application service client.

22. The device of claim 15, wherein the proxy unit obtains the mapping information from second one or more processors implementing a controller unit.

* * * * *